United States Patent
Seo

(10) Patent No.: US 9,497,269 B2
(45) Date of Patent: Nov. 15, 2016

(54) SERVICE SYSTEM AND METHOD OF PROVIDING SERVICE IN DIGITAL RECEIVER THEREOF

(71) Applicant: LG ELECTRONICS INC., Seoul (KR)

(72) Inventor: Chuhyun Seo, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 313 days.

(21) Appl. No.: 13/730,053

(22) Filed: Dec. 28, 2012

(65) Prior Publication Data

US 2013/0173710 A1 Jul. 4, 2013

(30) Foreign Application Priority Data

Dec. 28, 2011 (KR) ........................ 10-2011-0144739

(51) Int. Cl.
*G06F 15/16* (2006.01)
*H04L 29/08* (2006.01)
*G06Q 10/10* (2012.01)
*H04L 29/06* (2006.01)
(Continued)

(52) U.S. Cl.
CPC ........... *H04L 67/12* (2013.01); *G06F 3/04817* (2013.01); *G06Q 10/10* (2013.01); *H04H 20/93* (2013.01); *H04H 60/65* (2013.01); *H04H 60/72* (2013.01); *H04H 60/80* (2013.01); *H04L 29/06* (2013.01); *H04N 21/254* (2013.01); *H04N 21/26283* (2013.01); *H04N 21/4312* (2013.01); *H04N 21/4788* (2013.01); *H04N 21/8173* (2013.01); *H04H 60/372* (2013.01); *H04H 2201/37* (2013.01); *H04H 2201/40* (2013.01); *H04N 21/25816* (2013.01); *H04N 21/25866* (2013.01)

(58) Field of Classification Search
CPC ....... G06Q 10/10; H04L 29/06; H04L 64/12; G06F 3/04817

USPC ........................................................ 709/204
See application file for complete search history.

(56) References Cited

U.S. PATENT DOCUMENTS

2010/0037277 A1* 2/2010 Flynn-Ripley et al. ...... 725/110
2010/0242074 A1 9/2010 Rouse et al.
(Continued)

FOREIGN PATENT DOCUMENTS

| EP | 1099345 B1 | 10/2002 |
|---|---|---|
| WO | WO 00/13416 A1 | 3/2000 |
| WO | WO 2011/017311 A1 | 2/2011 |

OTHER PUBLICATIONS

Author Unknown, "Open API," Wikipedia, the free encyclopedia, Nov. 8, 2011, pp. 1-2, XP055241632.

*Primary Examiner* — Chris Parry
*Assistant Examiner* — Weiwei Stiltner
(74) *Attorney, Agent, or Firm* — Birch, Stewart, Kolasch & Birch, LLP

(57) ABSTRACT

Disclosed are a service system and a method of providing a service in a digital receiver. The service providing method includes selecting content including an identifier with respect to an SNS or a data exchange space that is opened in linkage with content from a service guide, and outputting the selected content and the SNS or the data exchange space linked to the content in respective areas of a screen. The SNS linked to the content includes a data exchange space configured to allow one or more SNS users to simultaneously access the data exchange space using an open API from the server, and also includes a SNS identifier having a format as access information for the corresponding data exchange space.

12 Claims, 16 Drawing Sheets

(51) Int. Cl.
*G06F 3/0481* (2013.01)
*H04N 21/254* (2011.01)
*H04N 21/262* (2011.01)
*H04N 21/431* (2011.01)
*H04N 21/4788* (2011.01)
*H04N 21/81* (2011.01)
*H04H 20/93* (2008.01)
*H04H 60/65* (2008.01)
*H04H 60/72* (2008.01)
*H04H 60/80* (2008.01)
*H04N 21/258* (2011.01)
*H04H 60/37* (2008.01)

(56) References Cited

U.S. PATENT DOCUMENTS

| | | | |
|---|---|---|---|
| 2011/0058101 A1* | 3/2011 | Earley | H04L 12/1822 348/461 |
| 2011/0153425 A1* | 6/2011 | Mercs | 705/14.54 |
| 2011/0314386 A1 | 12/2011 | Jeong et al. | |
| 2012/0042334 A1* | 2/2012 | Choi et al. | 725/32 |
| 2012/0054797 A1* | 3/2012 | Skog | H04N 21/4314 725/41 |
| 2012/0143661 A1* | 6/2012 | Roberts et al. | 705/14.4 |
| 2012/0215903 A1* | 8/2012 | Fleischman et al. | 709/224 |
| 2012/0271882 A1* | 10/2012 | Sachdeva et al. | 709/204 |
| 2013/0097236 A1* | 4/2013 | Khorashadi et al. | 709/204 |

* cited by examiner

SERVICE SYSTEM AND METHOD OF PROVIDING SERVICE IN DIGITAL RECEIVER THEREOF

This application claims the benefit of Korean Patent Application No. 10-2011-0144739, filed on, Dec. 28, 2011, which is hereby incorporated by reference as if fully set forth herein.

BACKGROUND OF THE INVENTION

1. Field of the Invention

The present invention relates to operation of a service system and a digital receiver, and more particularly to a service system for provision of a Social Networking Service (SNS) that has recently been popular and a method of providing the SNS in a digital receiver.

2. Discussion of the Related Art

Broadcasting is rapidly converting from analog to digital all over the world. As compared to traditional analog broadcasting, digital broadcasting has lower data loss owing to high resistance to noise, is advantageous for error correction, and provides higher resolution, and consequently more vivid imagery. Moreover, provision of a bidirectional service is possible under digital broadcasting unlike in analog broadcasting.

In addition to conventional media, such as terrestrial, satellite, and cable media, in recent years, an Internet Protocol Television (IPTV) broadcasting service related to digital content, such as real time broadcasting and Content on Demand (CoD), for example, has also been implemented via an IP network connected to individual homes.

Additionally, although SNSs are becoming increasingly popular due to wide diffusion of mobile appliances, such as smart-phones or tablet PCs, SNSs are less employed in TVs than the mobile appliances due to several limitations, such as options of a receiver and the size of a display, for example. Under such an environment, digital receivers cannot completely meet the needs of users, and cause inconvenience in that a user still has to satisfy a passive environment via a digital receiver.

SUMMARY OF THE INVENTION

Accordingly, the present invention is directed to a service system and a method of providing a service in a digital receiver that substantially obviate one or more problems due to limitations and disadvantages of the related art.

An object of the present invention is to provide a digital receiver to assist a variety of service scenarios and a service system for the same.

Another object of the present invention is to provide a method of providing a user of a digital receiver with a more active environment via a service system, thereby assisting the user in more easily and conveniently using services, such as an SNS, and a User Interface (UI) for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing a service in a digital receiver, includes selecting content including an identifier with respect to a Social Networking Service (SNS) or a data exchange space that is opened in linkage with content from a service guide, and outputting the selected content and the SNS or the data exchange space linked to the content in respective areas of a screen, wherein the SNS linked to the content includes a data exchange space configured to allow one or more SNS users to simultaneously access the data exchange space using an open Application Programming Interface (API) from the server, and also includes a SNS identifier having a format as access information for the corresponding data exchange space.

In accordance with another aspect of the present invention, a method of providing a service in a digital receiver includes executing an SNS, outputting, based on a reference, a list of at least one service item linked to at least one content among the executed SNS, and outputting a service window for the service item selected from the output list and content linked to the service item in respective areas of a screen.

In accordance with another aspect of the present invention, a digital receiver equipped in a service system includes a first receiving unit configured to receive a service guide including an identifier with respect to an SNS or a data exchange space that is opened in linkage with content from a server, a second receiving unit configured to select content from the service guide, a control unit configured to control output of the selected content and the SNS or the data exchange space linked to the content in respective areas of a screen, a decoder configured to configure the content and the SNS or the data exchange space under the control of the control unit, and a display unit configured to output the configured content and the configured SNS or data exchange space in the respective areas of the screen, wherein the SNS linked to the content includes a data exchange space configured to allow one or more SNS users to simultaneously access the data exchange space using an open API from the server, and also includes a SNS identifier having a format as access information for the corresponding data exchange space.

In accordance with a further aspect of the present invention, a digital receiver equipped in a service system includes a server configured to generate a service guide including an identifier with respect to an SNS or a data exchange space that is opened in linkage with content, a control unit configured to receive a request for execution of an SNS, generates a list of at least one SNS or data exchange space linked to at least one content, controls output of the SNS or the data exchange space based on a reference, and control output of at least one of the content and the SNS or the data exchange space selected from the list, and a display unit configured to output the content and the SNS or the data exchange space in respective areas of a screen under control of the control unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
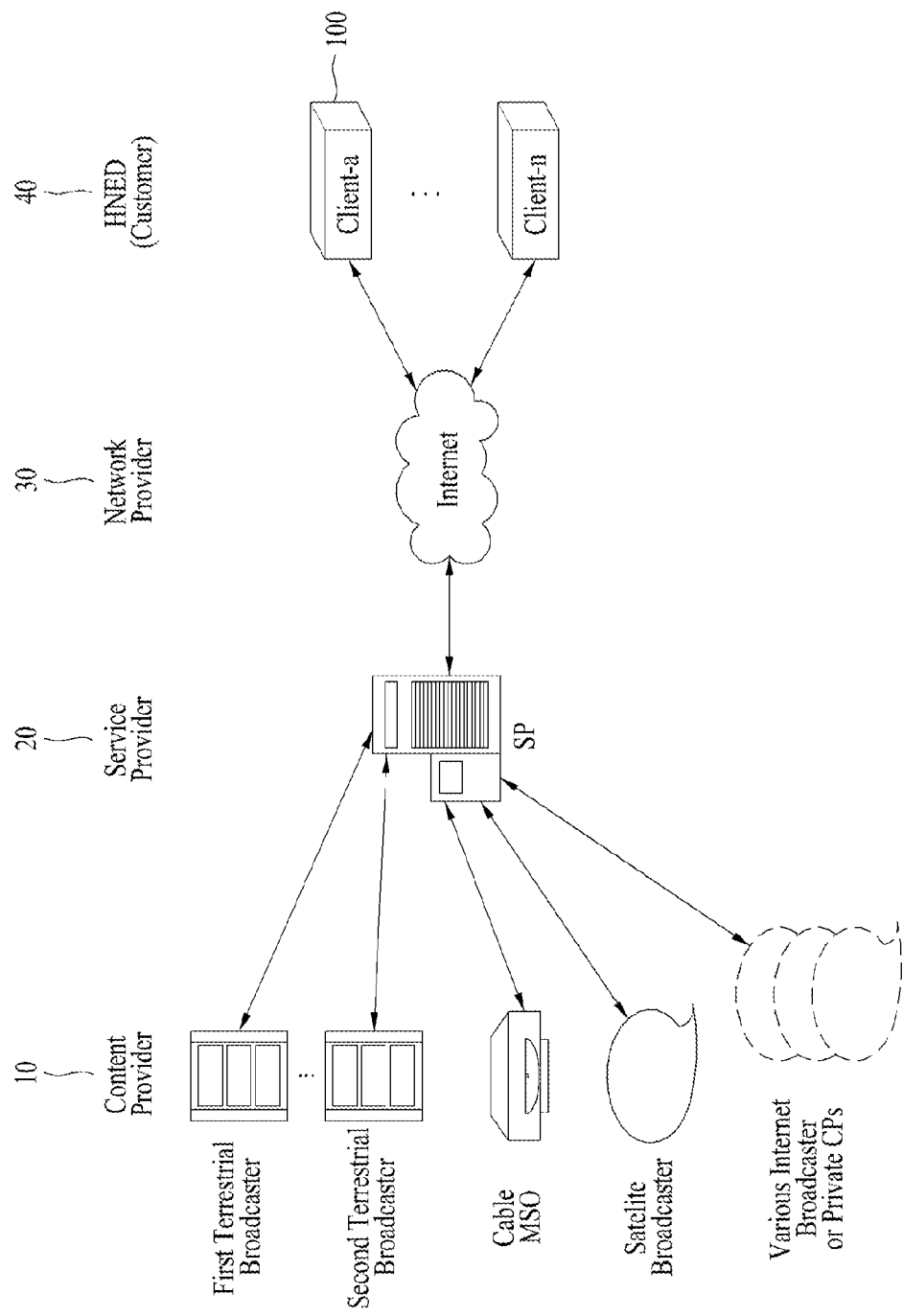
FIG. 1 is a view schematically illustrating an example of a broadcast system including a digital receiver according to the present invention.

Hereinafter, the present invention will be described in detail with reference to illustrations of the accompanying drawings.

The terms "module" and "unit" attached to describe the names of components are used herein to help the understanding of the components and thus should not be considered as having particular meanings or roles. Accordingly, the terms "module" and "unit" may be used interchangeably.

An example of a digital receiver according to the present invention as described herein is an intelligent receiver equipped with a computer support function in addition to a broadcasting reception function, for example. As a result of an Internet function being added to a broadcasting reception function, the digital receiver may include a convenient interface, such as a hand-writing input device, a touch screen, or a remote controller, for example. Further, owing to provision of wired or wireless Internet functions, the digital receiver may implement various functions, such as e-mail transmission/reception, Web browsing, banking, or gaming, for example, when connected to the Internet or a computer. To facilitate implementation of the aforementioned various functions, the digital receiver may operate based on a standard, general-purpose Operating System (OS). Additionally, the digital receiver may be configured such that various applications may be freely added to or deleted from, for example, a general-purpose OS kernel, and thus may implement various user friendly functions. This kind of digital receiver may include, for example, a network TV, a Hybrid Broadcast Broadband TV (HBBTV), a smart TV, and a social TV, and as occasion demands, may also include a smart-phone or a Personal Digital Assistant (PDA).

Hereinafter, various embodiments of the present invention will be described in detail with reference to the attached drawings and illustrations thereof, but it should be understood that the present invention is not restricted or limited by the embodiments that will be described hereinafter.

Although the terms used in the following description are selected, as much as possible, from general terms that are widely used at present while taking into consideration the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this case, the meanings of these terms may be described in corresponding description parts of the invention. Accordingly, it should be noted that the terms used herein should be construed based on practical meanings thereof and the whole content of this specification, rather than being simply construed based on names of the terms.

A digital receiver equipped in a service system for providing a Social Networking Service (SNS) according to an example of the present invention may include a first receiver that receives a service guide including an identifier with respect to an SNS or a data exchange space that is opened in linkage with content from a server, a second receiver that receives selected content from the service guide, a control unit that controls output of the selected content and the SNS or the data exchange space linked to the content in respective areas of a screen, a decoder that configures content and the SNS or the data exchange space under the control of the control unit, and a display unit that outputs the configured content and the configured SNS or data exchange space in the respective areas of the screen. In this case, the SNS linked to the content may include a data exchange space configured to allow a plurality of users of at least one SNS to simultaneously access the data exchange space using an open Application Programming Interface (API) from the server, and may also include a SNS identifier having a format as access information with respect to the corresponding data exchange space.

In the above described digital receiver, the second receiver may request opening of an SNS data exchange space linked to a particular program, and the control unit may determine whether or not a request for content change or channel switching is input, and may determine whether or not an SNS linked to changed content or a switched channel is present if the determined result shows that the request for content change or channel switching is input.

In the above description, the control unit may inquire whether or not to terminate an existing SNS, or may provide a new SNS after automatically terminating the existing SNS, based on the presence of the SNS linked to the changed content or the switched channel. The SNS may not be provided via execution of an application for the corresponding SNS previously provided in the digital receiver. The SNS identifier may be allotted from at least one of an associated SNS server and a server to which the digital receiver belongs. The format may be configured to provide the existing SNS with each data exchange space linked to the output content regardless of a service type. The SNS may be at least one of an open SNS and a closed SNS. The SNS identifier is exclusive to the corresponding digital receiver regardless of channel, content, and service types. The SNS may also provide view rating information on the corresponding content, and the digital receiver may further include a third receiver that receives a digital signal including content and signaling information on the content. The SNS linked to the content may be determined based on at least one reference selected from among a user of the same content, open chat with respect to common interest content, closed chat with respect to personal interest content, genre, sex, age, content, viewing rate, rating, time, channel, broadcast station, manufacturer, friend, and series.

A service system for an SNS according to an example of the present invention includes a server that generates a service guide including an identifier with respect to an SNS or a data exchange space that is opened in linkage with content, a control unit that receives a request for execution of an SNS, generates a list of at least one SNS or data exchange space linked to at least one content, controls output of the SNS or the data exchange space based on a reference, and controls output of at least one of the content and the SNS or the data exchange space selected from the list, and a display unit that outputs the content and the SNS or the data exchange space in respective areas of a screen under control of the control unit.

FIG. 1 is a view schematically illustrating an example of a broadcast system including a digital receiver according to the present invention.

As illustrated in FIG. 1, an example of a broadcast system equipped with a digital receiver according to the present invention includes a Content Provider (CP) 10, a Service Provider (SP) 20, a Network Provider (NP) 30, and a Home Network End User (FINED) (customer) 40. For example, the FINED 40 may be a client 100, i.e. a digital receiver according to the present invention. As described above, the HNED 40 may be a network TV, a smart-TV, or an IPTV, for example.

The content provider 10 produces and provides a variety of content. Examples of the content provider 1010, as illustrated in FIG. 1, may include a terrestrial broadcaster, a cable System Operator (cable SO), a Multiple System Operator (MSO), a satellite broadcaster, an Internet broadcaster, and a private content provider. The content provider 10 may provide, for example, a variety of applications as well as broadcast content. This will be described hereinafter in more detail.

The service provider 20 may service-package the content provided by the content provider 10, and transmit the service-packaged content. For example, the service provider 20 illustrated in FIG. 1 may package a first terrestrial broadcast, a second terrestrial broadcast, a cable MSO, a satellite broadcast, various Internet broadcasts, and applications, and provide the packaged broadcasts to a user.

The service provider 20 may provide a service to the client 100 using a uni-cast or multi-cast method. The uni-cast method is a method of transmitting data between a single transmitter and a single receiver in a one to one ratio. For example, if a receiver requests data to a server in the uni-cast method, the server transmits the data to the corresponding receiver in response to the request. On the other hand, the multi-cast method is a method of transmitting data to a plurality of receivers within a particular group. For example, a server transmits data to a plurality of pre-registered receivers simultaneously. For example, an Internet Group Management Protocol (IGMP) may be used for the multicast registration.

The content provider 10 and the service provider 20 may be the same entity. For example, the content provider 10 may produce content, service-package the content, and provide the packaged service. Thus, the content provider 10 may perform the function of the service provider 20. Of course, the converse case is also possible.

The network provider 30 may provide a network for data exchange between a server and the client 1100.

In the present invention, a server that will be described hereinafter may serve as a service provider, and a Cloud may serve as a service provider or a network provider.

The client 100 may build a home network to enable transmission/reception of data.

Meanwhile, for the sake of protection of content to be transmitted, a server included in a broadcast system may utilize certain means, such as conditional access and content protection means, for example. In this case, the client 100 may utilize means corresponding to the conditional access or content protection means, such as a cable card, a Downloadable Conditional Access System (DCAS), or the like.

In addition, the client 100 may adopt a bi-directional service via a network. In this case, the client 100 may also function as a content provider, and the service provider 20 may receive content from the client 100, and in turn transmit the content to another client.

Figure 2:
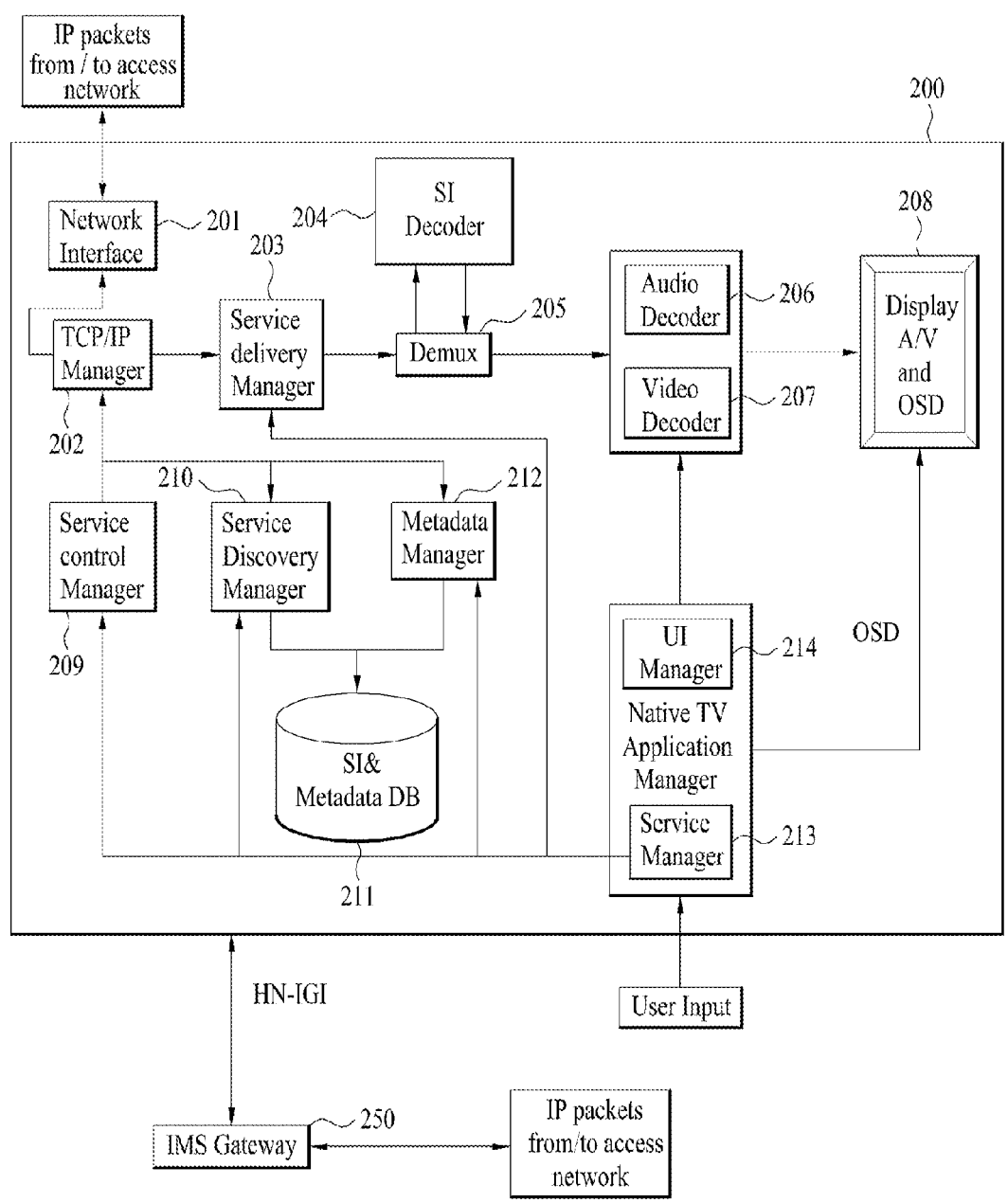
FIG. 2 is a view illustrating an example of a digital receiver according to the present invention.

FIG. 2 is a view illustrating an example of a digital receiver according to the present invention. FIG. 2 may correspond to the client of FIG. 1, for example.

A digital receiver 200 includes a network interface 201, a Transmission Control Protocol/Internet Protocol (TCP/IP) manager 202, a service delivery manager 203, a Service Information (SI) decoder 204, a demultiplexer (DEMUX) 205, an audio decoder 206, a video decoder 207, a display Audio/Video (A/V) and On Screen Display (OSD) module 208, a service control manager 209, a service discovery manager 210, an SI & metadata database (DB) 211, a metadata manager 212, a service manager 213, and a User Interface (UI) manager 214, for example.

The network interface 201 may receive or transmit IP packets via a network. That is, the network interface 201 may receive, for example, a service and content from the service provider 20 via a network.

The TCP/IP manager 202 has a role in transmission of the IP packets to and from the digital receiver 200, i.e. in packet transmission between a source and a destination. The TCP/IP manager 202 may sort the received packets to correspond to appropriate protocols, and output the sorted packets to the service delivery manager 203, the service discovery manager 210, the service control manager 209, and the metadata manager 212, for example.

The service delivery manager 203 serves to control received service data. For example, the service delivery manager 203 may use a Real time Transport Protocol (RTP)/RT Control Protocol (RTCP) in the case of controlling real time streaming data. When transmitting the real time streaming data using the RTP, the service delivery manager 203 may parse the received data packets based on the RTP and transmit the parsed data packets to the demultiplexer 205, or may store the receive data packets in the SI & metadata DB 211 based on control of the service manager 213. The service delivery manager 203 may return information received via the network to a service providing server using the RTCP.

The demultiplexer 205 demultiplexes the received packets to audio, video and System Information (SI) data, and transmits the demultiplexed data to the audio and video decoders 206 and 207 and the SI decoder 204.

The SI decoder 204 decodes service information, system information or signaling information, such as, for example, Program and System Information (PSI), PSI protocol (PSIP), and Digital Video Broadcasting Service Information (DVB-SI).

The SI decoder 204 stores the decoded service information in, for example, the SI & metadata DB 211. The stored service information, for example, may be read and used by a corresponding component in response to a user request. In the present invention, service information, related to an Electronic Program Guide (EPG) service depending on a user request, a channel browser service, or the like, may also be read from the SI & metadata DB 211. This will be described later in more detail.

The audio and video decoders 206 and 207 respectively decode audio data and video data demultiplexed in the demultiplexer 205. The decoded audio and video data are provided to a user via the display A/V and OSD module 208.

An application manager may consist of the UI manager 214 and the service manager 213, for example. The application manager may manage overall states of the digital receiver 200, provide a user interface, and manage other managers.

The UI manager 214 provides a Graphic User Interface (GUI) for a user using an OSD, and the like, and performs an operation of the receiver upon receiving a key input from the user. For example, when receiving a key input signal for channel selection from the user, the UI manager 214 transmits the key input signal to the service manager 213.

The service manager 213 controls a service associated manager, such as the service delivery manager 203, the service discovery manager 210, the service control manager 209, and the metadata manager 212, for example.

The service manager 213 makes a channel map, and selects a channel using the channel map based on the key input received from the UI manager 214. Additionally, the service manager 213 receives channel service information from the SI decoder 204, and sets an audio/video Packet Identifier (PID) of the selected channel to the demultiplexer 205. The set PID is used for the above-described demultiplexing. Thus, the demultiplexer 2050 filters audio data, video data and SI data using the PID.

The service discovery manager 210 provides information required to select a service provider that provides a service. When receiving a signal for channel selection from the service manager 213, the service discovery manager 210 searches a service using the information.

The service control manager 209 takes charge of selection and control of a service. For example, the service control manager 209 may perform selection and control of a service using the IGMP or a Real Time Streaming Protocol (RTSP) if a user selects a live broadcasting service of the same type as a traditional broadcasting service, or using the RTSP if the user selects a Video on Demand (VOD) service. The RTSP may provide a trick mode with respect to real time streaming. The service control manager 209 may initialize and manage a session through an IMS gateway 250 using an IP Multimedia Subsystem (IMS) and a Session Initiation Protocol (SIP). The aforementioned protocols are given by way of example, and other protocols may be used according to embodiments.

The metadata manager 212 manages service associated metadata, and stores the metadata in the SI & metadata DB 211.

The SI & metadata DB 211 stores the service information decoded by the SI decoder 204, the metadata managed by the metadata manager 212, and information required to select the SP provided by the service discovery manager 210. Additionally, the SI & metadata DB 211 may store, for example, system setup data.

The SI & metadata DB 211 may be realized using a Non-Volatile RAM (NVRAM), or a flash memory, for example.

The IMS gateway 250 may be a gateway in which functions required to access an IMS-based IPTV service are collected.

Figure 3:
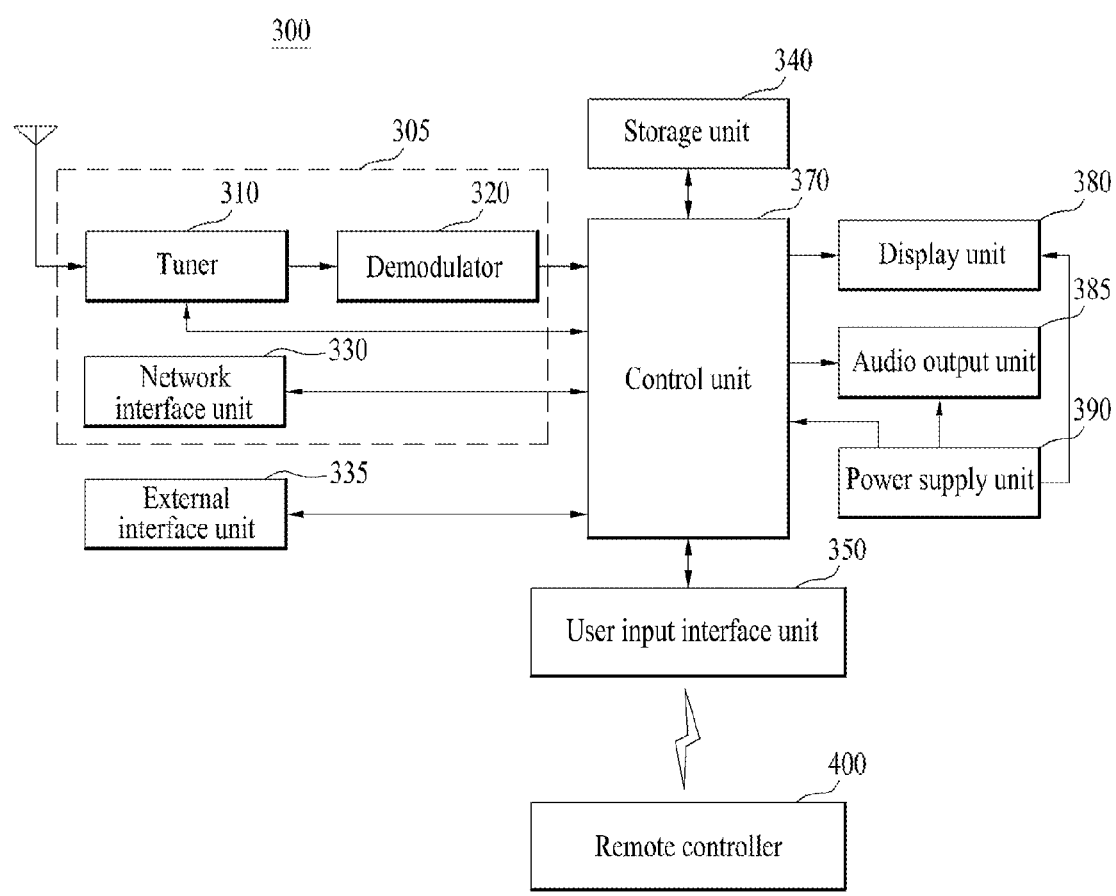
FIG. 3 is a view illustrating another example of a digital receiver according to the present invention.

FIG. 3 is a view illustrating another example of a digital receiver according to the present invention.

Referring to FIG. 3, an example of a digital receiver 300 according to the present invention may include a broadcast receiving unit 305, an external interface unit 335, a storage unit 340, a user input interface 350, a control unit 370, a display unit 380, an audio output unit 385, a power supply unit 390, and an image capturing unit (not shown). The broadcast receiving unit 305 may include at least one tuner 310, a demodulator 320, and a network interface unit 330. As occasion demands, the broadcast receiving unit 305 may be designed to include a tuner 310 and a demodulator 320 without a network interface unit 330, or may be designed to include only the network interface unit 330 without the tuner 310 and the demodulator 320. Although not illustrated, the broadcast receiving unit 305 may further include a multiplexer to multiplex a signal that has passed through the tuner 310 and demodulated by the demodulator 320 and a signal that has been received through the network interface unit 330. Additionally, although not illustrated, the broadcast receiving unit 305 may further include a demultiplexer to demultiplex the multiplexed signal or the demodulated signal, or to demultiplex the signal that has passed through the network interface unit 330.

The tuner 310 receives one of Radio Frequency (RF) broadcast signals received through an antenna by tuning a user-selected channel or all pre-stored channels. Then, the tuner 310 converts the received RF broadcast signal into an Intermediate Frequency (IF) signal or a baseband signal.

For example, the tuner 310 may convert the received RF broadcast signal into a digital IF (DIF) signal if the RF broadcast signal is a digital broadcast signal, or may convert the received RF broadcast signal into an analog baseband audio or video signal (Composite Video Banking Sync/Sound Intercarrier Frequency (CVBS/SIF) signal) if the RF broadcast signal is an analog broadcast signal. That is, the tuner 310 may process both digital and analog broadcast signals. The analog baseband audio or video signal (CVBS/SIF signal) output from the tuner 310 may be directly input to the control unit 370.

The tuner 310 may receive an RF broadcast signal of a single carrier based on an Advanced Television System Committee (ATSC) mode or an RF broadcast signal of multiple carriers based on a Digital Video Broadcasting (DVB) mode.

Additionally, the tuner 310 may convert one of the RF broadcast signals received through the antenna into the IF signal or the baseband signal by sequentially tuning and receiving the RF broadcast signals of all broadcast channels stored via a channel memory function.

The demodulator 320 receives and demodulates the digital IF signal converted in the tuner 310.

For example, if the digital IF signal output from the tuner 310 is based on the ATSC mode, the demodulator 320 performs, for example, 8-Vestigal Side Band (8-VSB) demodulation. Also, the demodulator 320 may perform channel decoding. To this end, the demodulator 320 may include a trellis decoder, a de-interleaver, and a Reed Solomon (RS) decoder, and may perform trellis decoding, de-interleaving, and RS decoding.

For example, if the digital IF signal output from the tuner 310 is based on the DVB mode, the demodulator 320 performs, for example, Coded Orthogonal Frequency Division Multiple Access (COFDMA) demodulation. Also, the demodulator 320 may perform channel decoding. To this end, the demodulator 320 may include a convolution decoder, a de-interleaver, and an RS decoder, and may perform convolution decoding, de-interleaving, and RS decoding.

The demodulator 320 may output a stream signal after performing the demodulation and the channel decoding. In this case, the stream signal may be obtained by multiplexing a video signal, an audio signal or a data signal. For example, the stream signal may be MPEG-2 Transport Stream (TS) obtained by multiplexing an MPEG-2 video signal or a Dolby AC-3 audio signal. More specifically, the MPEG-2 TS may contain a 4-bype header and a 184-byte payload.

The demodulator 320 as described above may be provided separately for the ATSC mode and the DVB mode. That is, the digital receiver may include an ATSC demodulator and a DVB demodulator.

The stream signal output from the demodulator 320 may be input to the control unit 370. For example, the control unit 370 may control demultiplexing and video/audio signal processing, and may also control video output through the display unit 380 and audio output through the audio output unit 385.

The external interface unit 335 provides the digital receiver 300 with an interface environment for a variety of external devices. To this end, the external interface unit 335 may include an A/V input/output unit (not shown) or a wireless communication unit (not shown).

The external interface unit 335 may be connected to an external device, such as a Digital Versatile Disk (DVD), a Blu-ray, a game device, a camera, a camcorder, a computer (e.g., a laptop computer), or the like, in a wired or wireless manner. The external interface unit 335 transmits a video, audio, or data signal externally input through the external device connected thereto, to the control unit 370 of the digital receiver. Also, the external interface unit 335 may output the video, audio or data signal processed by the control unit 370 to the external device. To this end, the external interface unit 335 may further include an A/V input/output unit or a wireless communication unit (not shown).

The A/V input/output unit may include a Universal Serial Bus (USB) terminal, a CVBS terminal, a component terminal, an S-video terminal (analog), a Digital Visual Interface (DVI) terminal, a High Definition Multimedia Interface (HDMI) terminal, an RGB terminal, and a D-SUB terminal, for example, to input video and audio signals of the external device to the digital receiver 300.

The wireless communication unit may perform a short range wireless communication with other electronic appliances. For example, network connection between the digital receiver 300 and other electronic appliances may be realized via a communication protocol, such as Bluetooth, Radio Frequency Identification (RFID), infrared Data Association (IrDA), Ultra Wideband (UWB), ZigBee, Digital Living Network Alliance (DLNA), and the like.

In addition, the external interface unit 335 may be connected to various set-top boxes through at least one of the above mentioned various terminals, and may perform an input/output operation with the set-top boxes.

The external interface unit 335 may receive an application or an application list from an adjacent external device, and may transmit the same to the control unit 370 or the storage unit 340.

The network interface unit 330 provides an interface for connecting the digital receiver 300 to a wired or wireless network including an Internet network. The network interface unit 330 may include an Ethernet terminal, for example, for wired network connection, or may use a communication standard, such as Wireless Local Area Network (WLAN) (Wi-Fi), Wireless broadband (Wibro), World Interoperability for Microwave Access (Wimax), and High Speed Downlink Packet Access (HSDPA), for example, for wireless network connection.

The network interface unit 330 may transmit or receive data to and from other users or other electronic appliances through a network connected thereto or another network linked on the connected network. In particular, the network interface unit 330 may transmit a part of content data stored in the digital receiver 300 to a selected one of other users previously registered in the digital receiver 300 or a selected one of other electronic appliances previously registered in the digital receiver 300.

The network interface unit 330 may access a predetermined Web page through a network connected thereto or another network linked on the connected network. That is, the network interface unit 330 may transmit or receive data to or from a corresponding server by accessing the predetermined Web page through the network. Additionally, the network interface unit 330 may receive content or data provided by a content provider or a network manager. More specifically, the network interface unit 330 may receive content, such as movies, advertisements, games, VOD, and broadcast signals, for example, and associated information provided by a content provider or a network manager through a network. In addition, the network interface unit 330 may receive update information and update files of firmware provided by a network manager, and may transmit data to the Internet, a content provider or a network manager.

The network interface unit 330 may select and receive a desired application among multiple applications that are open to the public through a network.

In the above description of FIGS. 2 and 3, the network interface unit 330, for example, may transmit and receive service data via communication with a server or Cloud that will be described hereinafter.

The storage unit 340 may store a program for processing and controlling each signal of the control unit 370, or may store the processed video, audio or data signal.

Also, the storage unit 340 may function to temporarily store the video, audio or data signal input from the external interface unit 335 or the network interface unit 330. The storage unit 340 may store information on a predetermined broadcast channel through a channel memory function.

The storage unit 340 may store an application or an application list input from the external interface unit 335 or the network interface unit 330. Additionally, the storage unit 340 may store various platforms that will be described hereinafter.

For example, the storage unit 340 may include a storage medium of at least one type of a flash memory type, a hard disk type, a multimedia card micro type, a card type memory (for example, SD or XD memory), RAM and ROM (for example, EEPROM). The digital receiver 300 may play a content file (for example, a moving picture file, a still image file, a music file, a text file, and an application file) stored in the storage unit 340 to provide the played content file to a user.

Although FIG. 3 shows the embodiment in which the storage unit 340 and the control unit 370 are provided separately, the scope of the invention is not limited to the embodiment of FIG. 3. The storage unit 340 may be included in the control unit 370.

The user input interface 350 may transmit a signal input by a user to the control unit 370, or may transmit a signal input from the control unit 370 to the user.

For example, the user input interface unit 350 may receive and process a control signal, such as power on/off, channel selection, and screen setup, for example, from a remote controller 400 in accordance with various communication modes, such as an RF communication mode and IR communication mode, for example. Alternatively, the user input interface unit 350 may transmit a control signal from the control unit 370 to the remote controller 400.

Also, the user input interface unit 350 may transmit a control signal input by a local key, such as a power key, a channel key, a volume key, and a setup key, to the control unit 370.

The user input interface unit 350 may transmit a control signal input by a sensing unit (not shown), which senses a user gesture, to the control unit 370, or may transmit the signal from the control unit 370 to the sensing unit (not shown). In this case, the sensing unit (not shown) may include a touch sensor, an audio sensor, a position sensor, and an action sensor, for example.

The control unit 370 may demultiplex a stream input through the tuner 310, the demodulator 320 or the external device interface 335, or may process the demultiplexed signal to generate and output a signal for a video and audio output.

The video signal processed by the control unit 370 may be input to the display unit 380 and be displayed as a corresponding image. Also, the video signal processed by the control unit 370 may be input to an external output device through the external interface unit 335.

The audio signal processed by the control unit 370 may be output to the audio output unit 385. Also, the audio signal processed by the control unit 370 may be input to an external output device through the external interface unit 335.

Although not illustrated in FIG. 3, the control unit 370 may include a demultiplexer and a video processor, for example.

The control unit 370 may control the overall operations of the digital receiver 300. For example, the control unit 370 may control the tuner 310, so as to tune an RF broadcast signal corresponding to a user-selected channel or a prestored channel.

The control unit 370 may control the digital receiver 300 in response to a user command input through the user input interface 3050, or using a program stored therein. In particular, the control unit 370 may access a network, and download an application or an application list selected by a user to the digital receiver 300.

In one example, the control unit 370 controls the tuner 310 so as to receive a signal of a channel selected in response to a specific channel selection command received through the user input interface unit 350. Then, the control unit 370 processes an audio, video or data signal of the selected channel. The control unit 370 may also output, for example, information on the user-selected channel as well as the processed video or audio signal to the display unit 380 or the audio output unit 385.

In another example, the control unit 370 may output a video or audio signal input from an external device, such as, for example, a camera or a camcorder through the external interface unit 335 to the display unit 380 or the audio output unit 385 in response to an external device video playback command received through the user input interface 350.

The control unit 370 may control the display unit 380 to display an image. For example, the control unit 370 may control the display unit 380 so as to display a broadcast image received from the tuner 310, an externally input image received through the external interface unit 335, an image received through the network interface unit 330, or an image stored in the storage unit 340. In this case, the image displayed on the display unit 380 may be a 2-Dimensional (2D) or 3-Dimensional (3D) still image or moving image.

Additionally, the control unit 370 may control content playback. Here, the content may be content stored in the digital receiver 300, received broadcasting content, or externally input content. The content may include at least one of a broadcast image, an externally input image, an audio file, a still image, an accessed Web page, and a text file.

In the case of entering an application view item, the control unit 370 may control display of an application or an application list that is stored in the digital receiver 300 or that is downloadable from an external network.

The control unit 370 may control installation and driving of an application downloaded from an external network in addition to various user interfaces. Also, the control unit 370 may control the display unit 380 to display an image associated with an application that is executed by user selection.

Although not illustrated in the drawings, a channel browsing processor to produce a thumbnail image corresponding to a channel signal or an externally input signal may be further provided.

The channel browsing processor may receive, for example, a stream signal output from the demodulator 320 or a stream signal output from the external interface unit 335, extract an image from the received stream signal, and produce a thumbnail image. The produced thumbnail image may be directly input to the control unit 370, or may be input after being encoded. Also, the produced thumbnail image may be encoded into a stream and input to the control unit 370. The control unit 3070 may control the display unit 380 to display a thumbnail list consisting of a plurality of input thumbnail images. The thumbnail images within the thumbnail list may be updated sequentially or simultaneously. As such, a user can readily identify content of a plurality of broadcasting channels.

The display unit 380 converts the video signal, data signal and OSD signal processed by the control unit 370 or the video signal and data signal received from the external interface unit 335 to R, G, B signals, respectively, to generate driving signals.

The display unit 380 may be selected from among a Plasma Display Panel (PDP), a Liquid Crystal Display (LCD), an Organic Light Emitting Diode (OLED), a flexible display, and a 3D display, for example.

The display unit 380 may take the form of a touchscreen. In this case, the display unit 380 may serve not only an output device, but also an input device.

The audio output unit 385 receives a signal audio-processed by the control unit 370, for example, a stereo signal, a 3.1 channel signal or a 5.1 channel signal, and outputs the received signal as sound. Various types of speakers may be used as the audio output unit 385.

To sense a user gesture, as described above, the digital receiver 300 may further include a sensing unit (not shown) that includes at least one of a touch sensor, an audio sensor, a position sensor, and an action sensor. The signal sensed by the sensing unit (not shown) may be transmitted to the control unit 370 through the user input interface unit 350.

The digital receiver 300 may further include an image capturing unit (not shown) to capture an image of a user.

Image information taken by the image capturing unit (not shown) may be input to the control unit 370.

The control unit 370 may sense a user gesture by using the image captured by the image capturing unit (not shown) and the signal sensed from the sensing unit (not shown), respectively or in combination.

The power supply unit 390 is provided to supply corresponding power to the entire digital receiver 300.

In particular, the power supply unit 390 may supply power to the control unit 370 that may be realized in a System on Chip (SOC) form, the display unit 380 for image display, and the audio output unit 385 for audio output.

To this end, the power supply unit 390 may include a converter (not shown) that converts AC power to DC power. For example, if the display unit 380 takes the form of a liquid crystal panel having a plurality of backlight lamps, it may further include an inverter (not shown) that is operable in a Pulse Width Modulation (PWM) manner for brightness change or dimming driving.

The remote controller 400 transmits a user input to the user input interface unit 350. To this end, the remote controller 400 may use Bluetooth, RF communication, IR communication, UWB, ZigBee, and the like.

Also, the remote controller 400 may receive the video signal, audio signal or data signal output from the user input interface 350 to display the received signal or output sound or vibration.

The above described digital receiver 300 may be a fixed type or mobile type digital broadcast receiver that can process ATSC mode or DVB mode digital broadcast signals.

The digital receiver illustrated in FIGS. 2 and 3 is provided according to the exemplary embodiments of the present invention, and the respective components thereof may be incorporated, added or omitted depending on options of the digital receiver which is actually implemented. In other words, two or more components may be incorporated into one component, or one component may be divided into two or more components, as necessary. Also, the function performed by each block is intended for description of the embodiment of the invention, and its detailed action or device does not limit the scope of the invention.

In addition, the digital receiver according to the present invention may further include some components not illustrated in FIG. 2 or may omit some components illustrated in FIG. 2 as necessary. Unlike the embodiments illustrated in FIGS. 2 and 3, the digital receiver may receive and play content through the network interface or the external interface unit without the tuner and the demodulator.

The digital receiver is an example of an image signal processor that performs signal processing of an image stored therein or an input image. Other examples of the image signal processor include a set-top box that excludes the display unit 380 and the audio output unit 385, the aforementioned DVD player, a blu-ray player, a game device, and a computer, as well as others. Among the aforementioned examples, the set-top box will be described hereinafter with reference to FIGS. 4 and 5.

Figure 4:
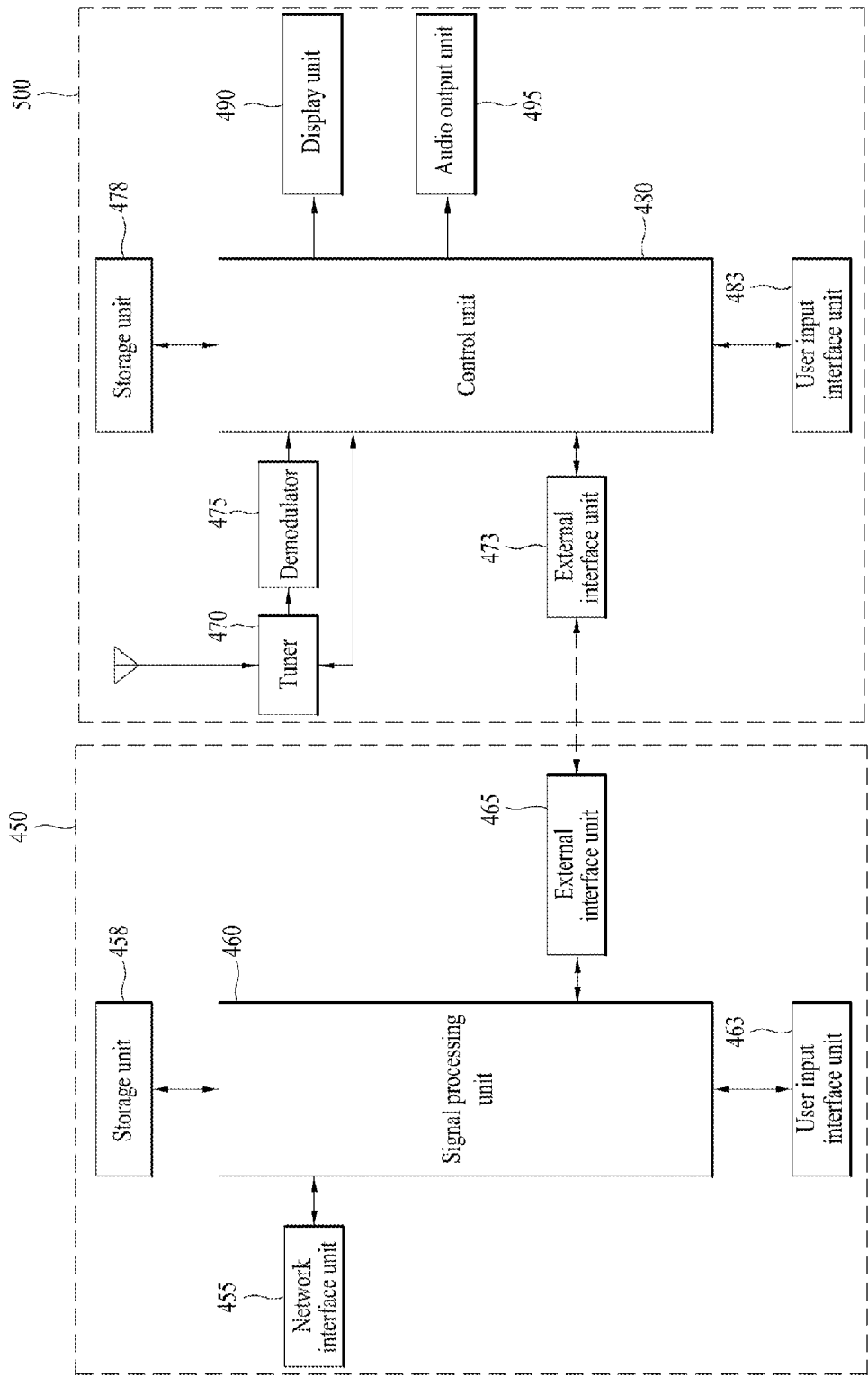
FIGS. 4 and 5 are block diagrams illustrating a detailed configuration of other examples of a digital receiver according to the present invention.
Figure 5:
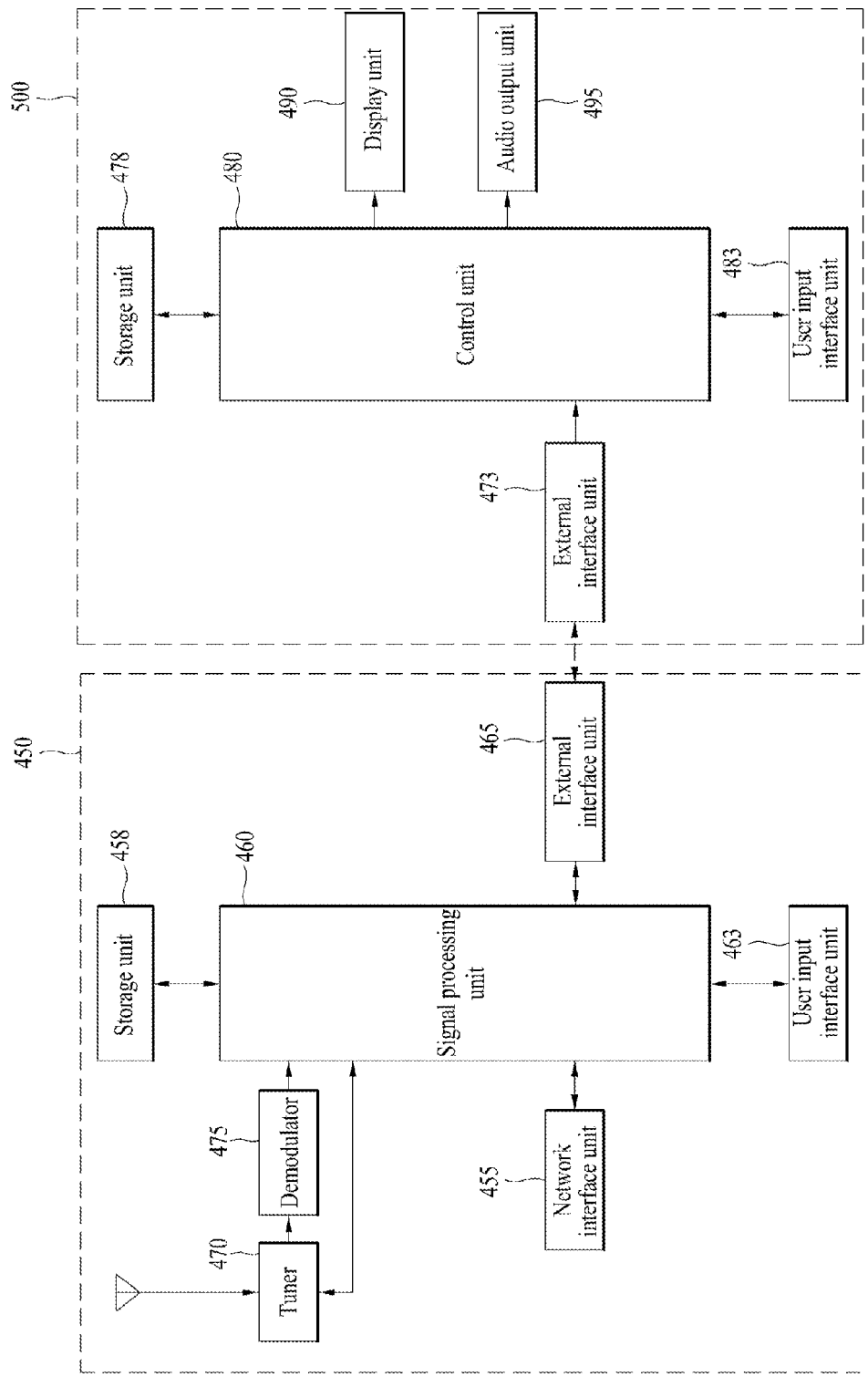

FIGS. 4 and 5 are block diagrams illustrating a detailed configuration of other examples of a digital receiver according to the present invention.

First, referring to FIG. 4, a set-top box 450 and a display device 500 may perform transmission or reception of data in a wired or wireless manner.

The set-top box 450 may include a network interface unit 455, a storage unit 458, a signal processing unit 460, a user input interface unit 463, and an external interface unit 465.

The network interface unit 455 provides an interface for connection with a wired or wireless network including an Internet network. The network interface unit 455 may enable data transmission/reception with other users or other appliances through a connected network or other networks linked on the connected network.

The storage unit 458 may store data for processing and control of each signal within the signal processing unit 460. The storage unit 458 may temporarily storage a video signal, an audio signal or a data signal input from the external interface unit 465 or the network interface unit 455.

The signal processing unit 460 performs processing of an input signal. For example, the signal processing unit 460 may perform demultiplexing or decoding of a video signal or an audio signal, for example. To this end, the signal processing unit 460 may include a video decoder and/or an audio decoder. The signal processing unit 460 may transmit a processed video signal and/or audio signal to the display device 500 through the external interface unit 465.

The user input interface unit 463 may transmit a user input signal to the signal processing unit 460 or a signal of the signal processing unit 460 to a user. For example, the user input interface unit 463 may receive various control signals, such as a power on/off signal, an operation input signal, and a setup signal, for example, input through a local key (not shown) or the remote controller 400, and transmit the received signal to the signal processing unit 460.

The external interface unit 465 provides an interface for transmission or reception of data with an external device connected thereto in a wired or wireless manner. In particular, the external interface unit 465 provides an interface for transmission or reception of data with the display device 500. The external interface unit 465 may provide an interface for transmission or reception of data with the external device, such as a game device, a camera, a camcorder, a computer (e.g., a laptop computer), or the like.

The set-top box 450 may further include a media input unit (not shown) for media playback. One example of the media input unit may include a Blu-ray input unit (not shown). That is, the set-top box 450 may include a Blu-ray player. An input medium, such as, for example, a Blu-ray disc, may be subjected to signal processing, such as demultiplexing or decoding, in the signal processing unit 460, and the resulting signal may be transmitted to the display device 500 through the external interface unit 465 so as to be displayed on the display device 500.

The display device 500 may include a tuner 470, an external interface unit 473, a demodulator 475, a storage unit 478, a control unit 480, a user input interface unit 483, a display unit 490, and an audio output unit 495.

The tuner 470, the demodulator 475, the storage unit 478, the control unit 480, the user input interface unit 483, the display unit 490, and the audio output unit 495 correspond to the tuner 310, the demodulator 320, the storage unit 340, the control unit 370, the user input interface unit 350, the display unit 380, and the audio output unit 385 as described above in FIG. 3, and thus a description thereof will be replaced by the above description of FIG. 3 and will hereinafter not be described in detail.

The external interface unit 473 provides an interface for transmission or reception of data with an external device connected thereto in a wired or wireless manner. In particular, the external interface unit 473 provides an interface for transmission or reception of data with the set-top box 450.

As such, a video signal or an audio signal input through the set-top box 450 passes through the control unit 470 and is output from the display unit 490 or the audio output unit 485.

Referring to FIG. 5, although the set-top box 450 and the display device 500 are substantially equal to the set-top box 450 and the display device 500 illustrated in FIG. 4, the tuner 470 and the demodulator 475 are mounted in the set-top box 450 rather than being mounted in the display device 500 unlike the illustration of FIG. 4. Hereinafter, a repeated description will be replaced by the above description, and only differences will be described.

The signal processing unit 460 performs processing of a broadcast signal received through the tuner 470 and the demodulator 475. The user input interface unit 463 receives an input with respect to channel selection and channel storage, for example.

Figure 6:
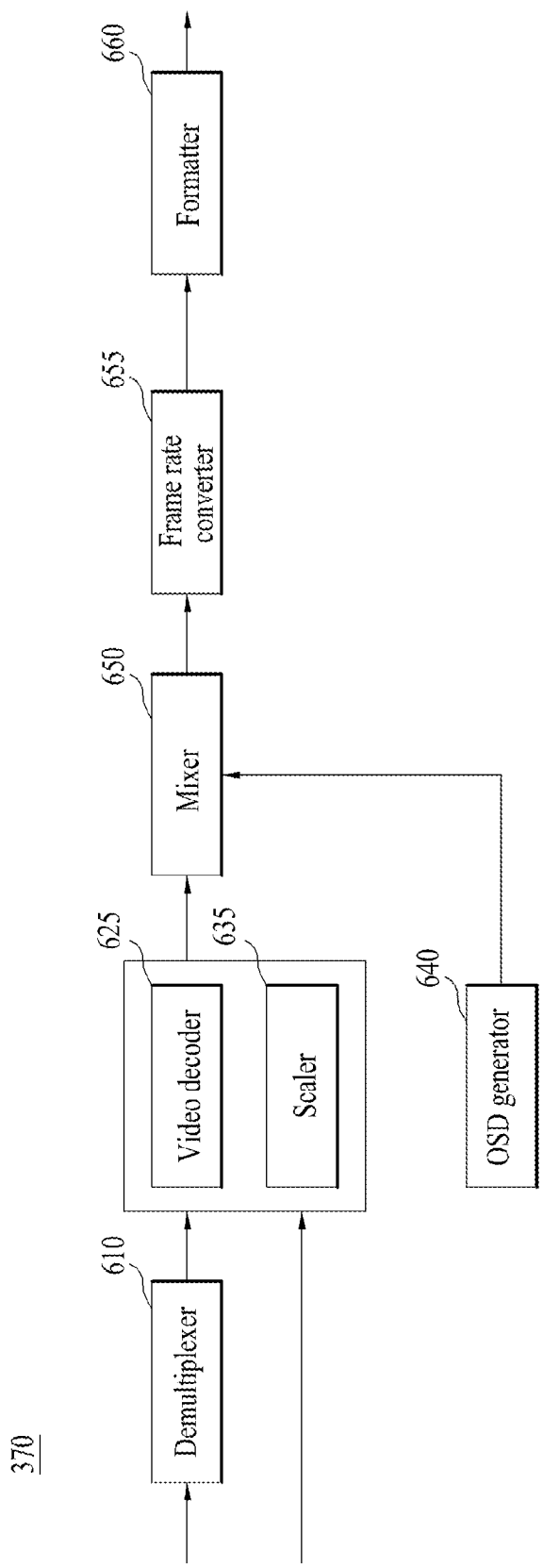
FIG. 6 is a block diagram illustrating an example of internal components of a control unit illustrated in FIG. 3.

FIG. 6 is a block diagram illustrating an example of internal components of the control unit illustrated in FIG. 3. A description with reference to FIGS. 3 and 6 is as follows.

An example of a control unit 670 according to the present invention may include a demultiplexer 610, an image processor 620, an On-Screen Display (OSD) generator 640, a mixer 650, a Frame Rate Converter (FRC) 655, and a formatter 660. The control unit 670 may further include an audio processor (not shown) and a data processor (not shown).

The demultiplexer 610 serves to demultiplex an input stream. For example, the demultiplexer 610 may demultiplex an input MPEG-2 TS into a video signal, an audio signal, and a data signal. Here, the stream signal input to the demultiplexer 610 may be a stream signal output from the tuner 310, the demodulator 320, or the external interface unit 335.

The video processor 620 processes the demultiplexed video signal. To this end, the video processor 620 may include a video decoder 625 and a scaler 635.

The video decoder 625 decodes the demultiplexed video signal, and the scaler 635 scales a resolution of the decoded video signal so that the video signal can be displayed on the display unit 380.

The video decoder 625 may operate based on various standards. For example, the video decoder 625 may function as an MPEG-2 decoder if the video signal is an MPEG-2 encoded video signal. Also, the video decoder 625 may function as an H.264 decoder if the video signal is a Digital Multimedia Broadcasting (DMB) or H.264 encoded signal.

The video signal decoded by the video processor 620 is input to the mixer 650.

The OSD generator 640 generates OSD data autonomously or in response to a user input. For example, the OSD generator 640 generates data, by which a variety of data is displayed as graphics or text on a screen of the display unit 380, based on a control signal of the user input interface unit 350. The generated OSD data includes various data, such as a UI screen of the digital receiver 300, a variety of menu screens, widgets, icons, and information on an audience rating, for example.

The OSD generator 640 may generate data, by which subtitles are displayed for a broadcast image or EPG-based broadcasting information.

The mixer 650 may mix the video signal processed by the video processor 620 with the OSD data generated by the OSD generator 640, and output the mixed signal to the formatter 660. As the decoded video signal is mixed with the OSD data, an OSD may be overlaid on the broadcast image or the externally input image.

The FRC 655 may change the frame rate of an input image. For example, the FRC 655 may change a frame rate of 60 Hz of an input image into a frame rate of 120 or 240 Hz according to an output frequency of the display unit 380. As described above, a variety of methods to change the frame rate may be used. In one example, if the frame rate is to be changed from 60 Hz to 120 Hz, the FRC 655 may insert a first frame between the first frame and a second frame, or may insert a third frame predicted from the first and second frames. In another example, if the frame rate is to be changed from 60 Hz to 240 Hz, the FRC 655 may insert three identical frames or three predicted frames between the existing frames. It is also possible to bypass the FRC 655 when frame rate change is not performed.

The formatter 660 changes the output of the FRC 655 to suit the output format of the display unit 380. For example, the formatter 660 may output R, G and B data signals. The R, G, and B data signals may be output in the form of a Low Voltage Differential Signal (LVDS) or mini-LVDS. Also, if the FRC 655 outputs a 3D video signal, the formatter 660 converts the 3D video signal into a 3D signal to suit the output format of the display unit 380, thereby assisting a 3D service via the display unit 380.

The audio processor (not shown) of the control unit 670 may process the demultiplexed audio signal. The audio processor (not shown) may be configured to process a variety of audio formats. For example, if the audio signal is encoded into an MPEG-2, MPEG-4, AAC, HE-AAC, AC-3, and BSAC format, the audio processor (not shown) may include corresponding decoders to process the respective encoded signals.

The audio processor (not shown) within the control unit 670 may also adjust the base, treble, and volume of the audio signal.

The data processor (not shown) within the control unit 670 may process the demultiplexed data signal. For example, if the demultiplexed data signal is an encoded data signal, the data processor may decode the encoded data signal. Here, the encoded data signal may include Electronic Program Guide (EPG) information, which includes broadcast information specifying, for example, the start time and end time of scheduled broadcast programs of each channel.

The control unit 670 illustrated in FIG. 6 is given by way of example, and other components may be added or some of the illustrated components may be omitted according to the needs of those skilled in the art.

Figure 7:
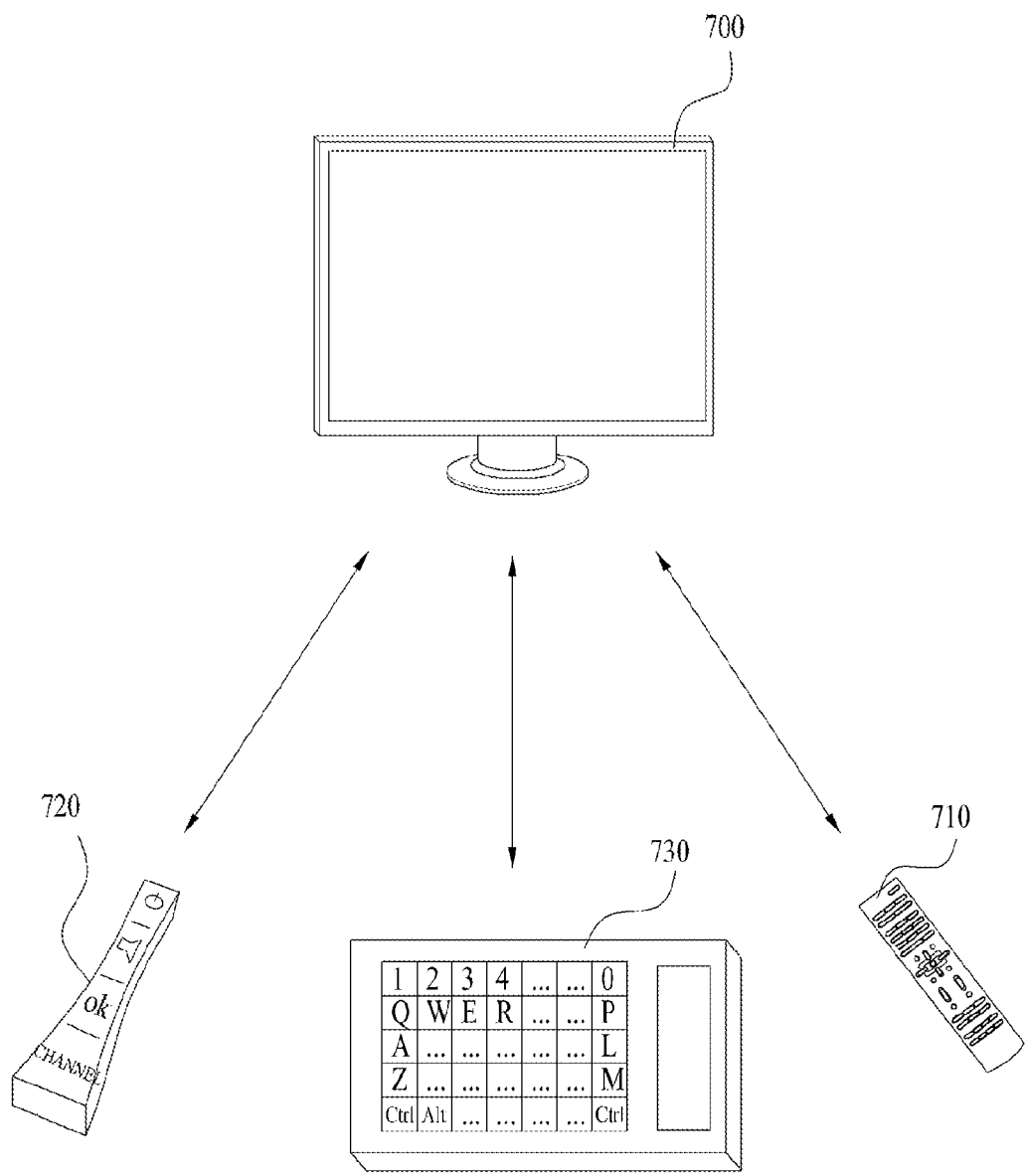
FIG. 7 is a view illustrating remote controllers of a digital receiver according to the present invention.

FIG. 7 is a view illustrating remote controllers of a digital receiver according to the present invention.

According to embodiments, to perform various operations for implementation of the present invention, various User Interface Devices (UIDs) that can perform wired or wireless communication with a digital receiver 700 may be used as a remote controller. In addition to the user interface devices only for the digital receiver 700, other portable devices, such as smart phones and tablet PCs, for example, may be used as a remote controller.

The remote controller may use various communication standards, such as Bluetooth, Radio Frequency Identification (RFID), infrared Data Association (IrDA), UWB, ZigBee, Digital Living Network Alliance (DLNA), and the like.

The user interface devices may include a typical remote controller 710, a magic remote controller 720, and a remote controller 730 equipped with a keyboard and a touch pad, for example.

The magic remote controller 740 may be internally equipped with a gyro sensor therein to detect trembling or rotation of the hand. That is, the magic remote controller 740 may move a pointer as a user moves the magic remote controller 740 up and down, side to side, and back and forth, which assists the user in easily performing a desired operation, for example, in easily controlling a channel or a menu.

In the case of the remote controller 730 equipped with a keyboard and a touch pad, the keyboard facilitates easy input of text, and the touch pad facilitates easy movement of the pointer and control in the expansion and reduction of pictures or moving images.

To receive information on an EPG, thumbnail image, channel browser, and viewing rate, for example, according to the present invention, a user may easily perform various operations, such as selection of a particular menu item, for example, via the aforementioned various user interface devices.

Hereinafter, various embodiments of a service system and a method of processing a service in a digital receiver according to the present invention will be described in more detail with reference to the accompanying drawings.

To provide a further understanding of the present invention and convenience of explanation, a service will be described as a SNS herein by way of example. Accordingly, a digital receiver, for example, includes a smart-TV or a social-TV that provides an SNS. Meanwhile, in the present invention, an SNS provided by the digital receiver will be described as classified into an open SNS and a closed SNS. It is noted that this illustration and division or classification is given to provide a further understanding of the present invention and convenience of explanation and the present invention is not limited to embodiments that will be described hereinafter.

To use an SNS via a digital receiver, for example, a user typically has to execute an application for an SNS stored in the digital receiver or after downloading the corresponding application, and then to perform service admission and log-in procedures. Additionally, to, access a data exchange space established within the SNS in relation to content (for example, a chat group as a subordinate structure of an SNS), the user has to perform a search procedure after the aforementioned procedures. Even in this case, if a plurality of data exchange spaces is established and a sufficient amount of search information is not provided, significant time and effort are required to access a desired data exchange space. This may result in user dissatisfaction and inconvenience with respect to use of an SNS.

To solve the above described problem, the present invention is devised to assist a user in more easily and conveniently accessing and using an SNS using a digital receiver even without performing the aforementioned troublesome procedures, such as execution of an SNS application, service admission and log-in procedures. Here, the SNS may be referred to as all SNSs linked to or not linked to content. Content is referred to as all services and/or applications that can be driven or realized by a digital receiver, such as broadcast services, games, and external inputs, for example. In conclusion, differently from a conventional SNS providing method in which a digital receiver provides a service UI, a screen, or the like that is associated with an SNS application if the user calls and executes the corresponding SNS application, the present invention relates to a service system and a method of providing a service in a digital receiver, which allows a user who does not join an SNS or even a member of the corresponding SNS to more rapidly and conveniently use content and an SNS linked to the content even without executing an application for the corresponding SNS and/or performing the log-in procedure.

As described above, to provide a further understanding of the present invention and convenience of explanation, an open SNS and a closed SNS will hereinafter be described respectively.

According to an embodiment of the present invention, a service providing method to provide information on content to, for example, a service guide may provide an area of a digital receiver with an SNS linked to the corresponding content, thereby assisting the user in more easily and conveniently using the corresponding content. Here, using the content, for example, may include watching, playback, recording and recording reservation of the corresponding content.

Meanwhile, in the present invention, although the SNS is an SNS linked to content, an SNS to be executed may not be a data exchange space with respect to content. For example, a data exchange space with respect to content may be referred to as an open SNS, and the converse case may be referred to as a closed SNS. This will hereinafter be described in more detail. An SNS according to the present invention may be provided based on various references, such as users of the same content, open chat in relation to common interest content, closed chat in relation to personal interest content, genre, sex, age, content, viewing rate, rating, time, channel, broadcast station, manufacturer, friend, and series, for example. In this case, although the aforementioned references may individually be a reference for provision of an SNS, two or more of the references may be combined to serve as a reference as necessary.

Even if a digital receiver is not set such that an SNS is driven simultaneously with content playback via, for example, the service guide as described above, the digital receiver may provide a user with, for example, a text or an alarm indicating that an SNS provided in relation to content that is being played back is present or is newly open, or that a friend turns on his/her digital receiver or invites a user while the user uses the corresponding SNS. For convenience of access, the digital receiver may adopt the same access method as in the above described service guide. For example, the digital receiver may provide identifier information, such as temporary log-in information for access to an SNS.

Meanwhile, the digital receiver may provide functions of an SNS, such as friend registration, invitation, and message service, for example, in relation to a user who uses the corresponding SNS. In this case, assuming that an SNS is provided in an area of the digital receiver, the digital receiver may automatically execute an associated User Interface (UI), such as an emoticon and a keyboard image, for example, for convenience of use.

In the present invention, the digital receiver is not limited to a fixed digital broadcast receiver, and may be linked to a mobile device, such as, a smart-phone or tablet PC, for example. Assuming that the digital receiver is a TV and a user attempts to watch the TV while using an SNS via a mobile device, the TV may provide a window for automatic execution and/or log-in of an application for the SNS used in the mobile device or for execution of another SNS in response to a user request. In this case, the TV may display all data previously used in the mobile device and provide an associated UI. The user may use the SNS executed in the TV while continuously using the mobile device as input means. Also, the mobile device may end the SNS and only the TV may drive the corresponding SNS.

If change in the playback or execution of content occurs during use of an SNS linked to the content according to the present invention, a question of handling of the SNS being driven may be raised. For example, the occurrence of change may refer to, the case in which an SNS has been used during execution of a game application and thereafter the game application is terminating, the case in which a user shuts down a broadcast program, and the case in which change in the status of content, such as channel switching, occurs. In one example, it is assumed that content is a broadcast program. In this case, if the user switches a channel during use of an SNS linked to a broadcast program while watching the broadcast program, it is necessary to determine whether or not to continuously provide the SNS that is currently used even in a switched channel or to terminate provision of the SNS. Further, if even the switched channel provides a new SNS, a question of handling of the existing SNS may be raised. In the aforementioned cases, different solutions may be proposed between an open SNS and a closed SNS. For example, in the case of an open SNS, the digital receiver may provide an inquiry about whether or not to terminate an SNS that has been executed in a previous channel and/or an inquiry as to whether or not to participate in an SNS that is provided in a switched channel and/or an execution UI, thereby providing an SNS based on user selection. However, since it is likely that the user is simply searching channels or erroneously switches a channel, the SNS may be passively executed based on user selection. If the switched channel is maintained for a predetermined time or more, the digital receiver may automatically or manually provide an inquiry about whether or not to maintain the previously activated SNS, or may terminate or switch the SNS. On the other hand, in the case of a closed SNS, the digital receiver may directly use identification information of a previous channel, or may request new identification information to a server when automatically coming in an SNS activated in a switched channel.

Meanwhile, if a plurality of SNSs is linked to single content or an SNS contains a plurality of data exchange spaces, a question of handling of this situation may be raised. To handle this situation, in one example, the digital receiver or the server may provide each SNS or each data exchange space with data sorted based on a reference, such as a participation rate, the number of participants, the degree of activation, the presence of friends, and the presence of a theme, for example. As such, the user may manually select an SNS or a data exchange space based on the aforementioned information, or the digital receiver or the server may automatically select and provide an SNS or a data exchange space in consideration of tendency of a user previously stored therein.

Additionally, the digital receiver may simultaneously provide a plurality of SNSs or a plurality of data exchange spaces established in an SNS during use of content. For example, as described above, the digital receiver may simultaneously or successively provide the open SNS and the closed SNS, and may provide only high rank spaces among a plurality of data exchange spaces established in an SNS linked to content based on the aforementioned reference.

The method of providing a service in the digital receiver according to the present invention may use an open API that is basically provided by a service providing enterprise, a server, and the like. The open API is used in the closed SNS as well as the open SNS that will be described below.

Hereinafter, first, the service system associated with provision of a service according to the present invention will be described. As described above, provision of a service according to the present invention may be accomplished via a service guide. In this case, basically, the service guide, thumbnail images, and channel browsers, and the like (hereinafter, commonly referred to as a service guide for convenience) may be provided via the service system that will be described hereinafter. Of course, the service according to the present invention may also be provided via the service system that will be described hereinafter.

Figure 8:
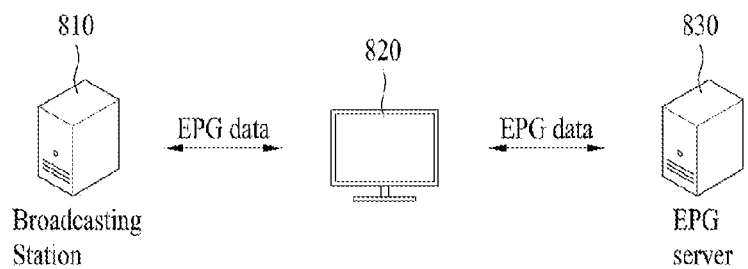
FIG. 8 is a block diagram illustrating an example of a service system according to the present invention.

FIG. 8 is a block diagram illustrating an example of a service system according to the present invention. FIG. 8 illustrates a service system that processes a service, such as an SNS, a service guide, a thumbnail image, a channel browser, and information on viewing rate, for example. In this case, for convenience of explanation, the service system will be described as providing an EPG service by way of example, and handling of an SNS will be described in detail in the corresponding part of the specification.

A digital receiver 820 may configure and provide an EPG by receiving EPG data as one example of service information from a broadcast station 810. Alternatively, the digital receiver 820 may configure and provide an EPG by receiving EPG data from an EPG server 830 that serves as an EPG data source.

In the former case, the EPG data is, for example, transmitted in the form of service information or system information (SI) included in a digital broadcast signal that is received from the digital receiver 820 through a tuned channel. The service information, for example, may include a Service Description Table (SDT) and Event Information Table (EIT) in the case of a DVB system, and may include PSI/PSIP information, such as a Program Association Table (PAT), Program Map Table (PMT), Virtual Channel Table (VCT), EIT, and the like in the case of an ATSC system. The digital receiver 820 parses the received service information, and configures an EPG based on the parsed data so as to provide a service. However, it is likely that the service information transmitted from the broadcast station 810 is not sufficient to provide the corresponding service, and there is a limit to the quality of a service because the digital receiver should perform tuning of a corresponding channel and due to a limit to tunable channels.

In the latter case, the external server 830 is an individual EPG service server, and provides additional EPG data distinguished from or not provided by the service information of the broadcast station 810 or various other data related to prime time or prime program. However, the resulting service may require an individual contract and be a pay service in most cases, and may require basic EPG data.

As described above, the digital receiver 820 may receive EPG service data transmitted from the broadcast station 810 or the EPG server 830 to provide the data to the user, or may receive EPG service data from both the broadcast station 810 and the EPG server 830 to provide the combined EPG data to the user.

Figure 9:
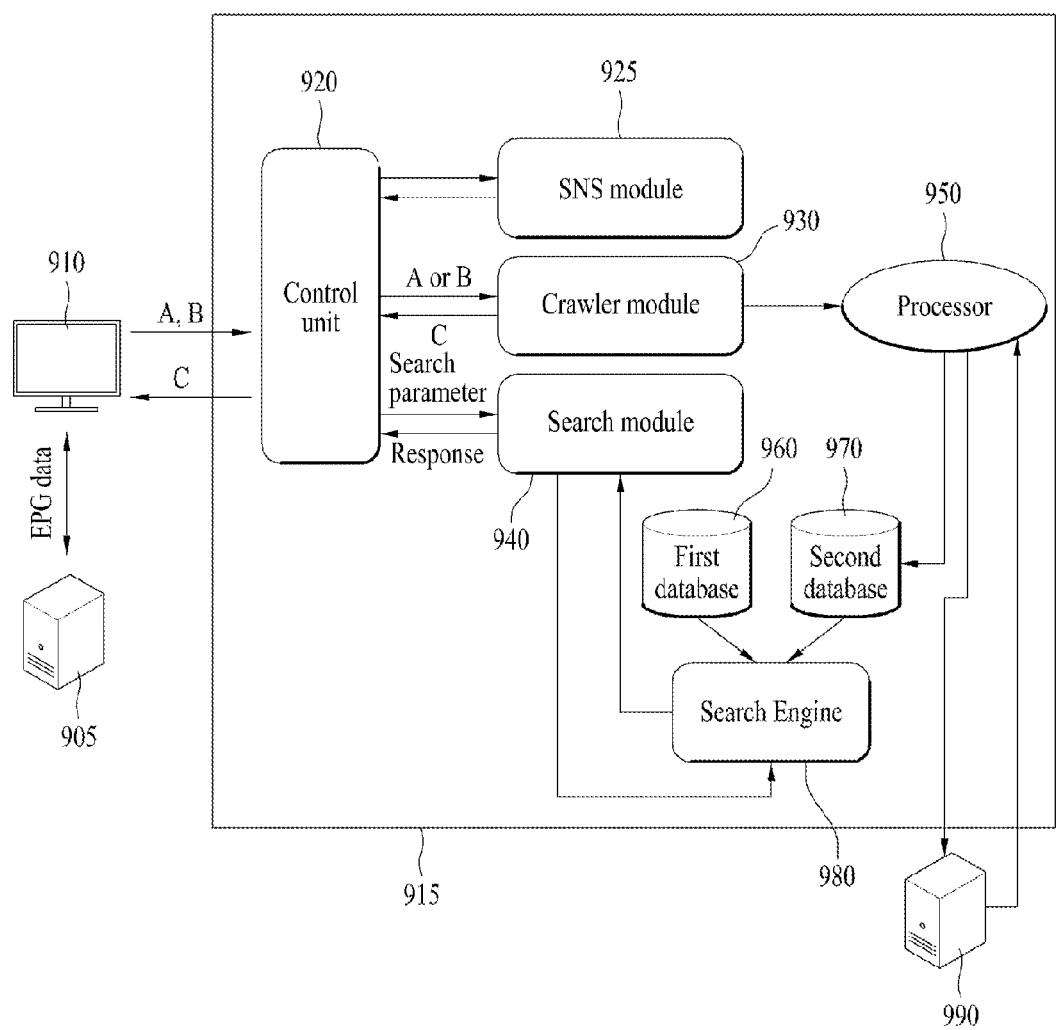
FIG. 9 is a block diagram illustrating another example of a service system according to the present invention.

FIG. 9 is a block diagram illustrating another example of a service system according to the present invention.

Referring to FIG. 9, the service system according to the present invention may basically include a broadcast station 905, a digital receiver 910, and a first server 915. Here, the first server 915, for example, may be a server that is provided by a manufacturer of the digital receiver 910. The first server 915 may include a control unit 920, an SNS module 925, a crawler module 930, a search module 940, a processor 950, databases 960 and 970, and a search engine 980, for example. The service system may further include, for example, a second server 990 for providing an EPG and/or an SNS as described above. Although FIG. 9 illustrates the single second server 990, the second server 990 may be a combination of an EPG providing server and an SNS providing server separately provided. Meanwhile, although the service system of FIG. 9 is illustrated as including only components required for explanation of the present invention, some of the components may be omitted or other components may be added as necessary. Also, some of the illustrated components may be integrated into a single module, or a single component may consist of a plurality of modules. In addition, although the SNS module 925 may be provided, for example, as a separate module as illustrated, in relation to the present invention, the SNS module 925 may be integrated with the control unit 920 or the crawler module 930.

As described above, the digital receiver 910 may receive EPG data from service information (SI) contained in a digital broadcast signal received from the broadcast station 905 and/or from the second server 990. However, EPG data received from the broadcast station 905 or EPG data provided by the EPG information provider 990 has low channel or service coverage on a per local area basis (about less than 50%), and therefore the digital receiver 910 has a difficulty in providing the user with an EPG service faithful to an actual broadcast environment. In other words, the single digital receiver cannot provide an accurate EPG service sufficient to meet a user demand due to low service coverage and insufficient metadata thereof even when acquiring EPG data as described above.

Accordingly, as described above herein, to complement a shortcoming that the broadcast station 905 and/or the second server 990 are practically insufficient to meet a user demand for an EPG service, the first server 915 is devised to provide an EPG service by collecting EPG data of each digital receiver and storing and managing the collected data in a database.

In other words, differently from a conventional digital receiver, according to the present invention, the first server 915 may collect EPG data from a plurality of digital receivers within the same service list and/or combine EPG data of the second server 990, and may transmit the acquired EPG data to the digital receivers, so as to provide an advanced EPG service containing the latest update information within a short time.

In the present invention, when the aforementioned advanced EPG service is transmitted from the first server 915 to the digital receiver 910, as described above, information to provide an SNS linked to content may also be transmitted. Here, the information to provide an SNS linked to content, for example, includes identifier information as access information to provide an SNS linked to content according to the present invention. In addition to the identifier information, the information may further include detailed information on the corresponding SNS and/or other additional information. The identifier information includes, for example, log-in information. In other words, the first server 915 generates SNS information associated with, for example, an EPG service to be provided to the digital receiver 910 through the SNS module 925. The first server 915 generates, for example, a data exchange space for an SNS linked to content and also generates various information on the data exchange space. Here, the SNS may be, for example, a general broadly known SNS or an SNS provided by a manufacturer. In the case of the former, for example, the first server 915 may generate a data exchange space for provision of an SNS via communication with a corresponding SNS server, and then generate identifier information on the data exchange space, although the first server 915 may autonomously generate the data exchange space and the information. Alternatively, the first server 915 may take charge of only connection and transmission among all the above described SNS associated operations, and generation of all information including the identifier information may be performed by the external SNS server 990.

Figure 10:
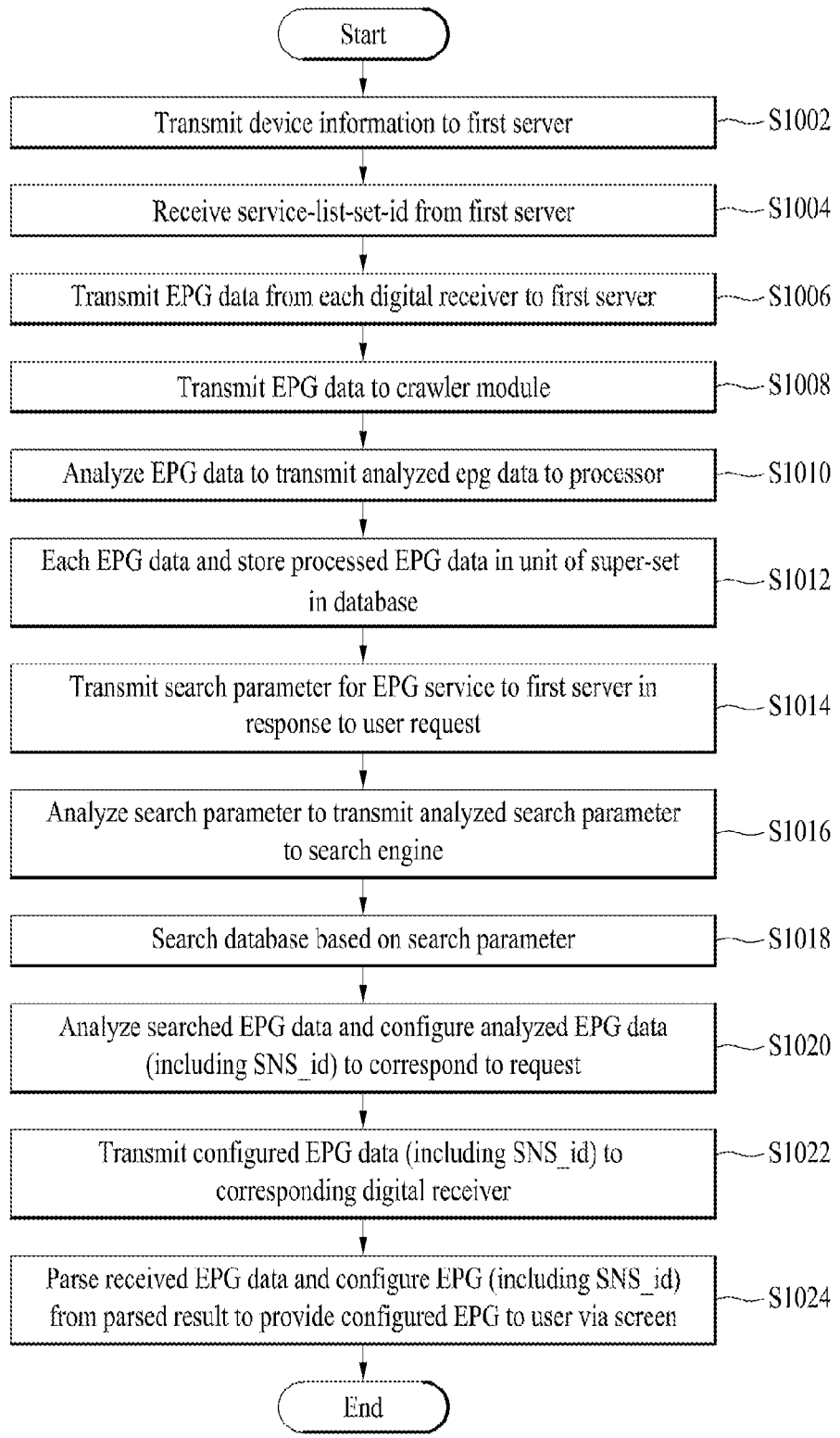
FIG. 10 is a flowchart illustrating an example of a method of providing a service in a digital broadcast system according to the present invention.

Hereinafter, the service system and the method of providing the EPG service in the digital receiver 910 according to the present invention will be described in more detail with reference to FIG. 10. FIG. 10 is a flowchart illustrating an example of a method of providing a service in a digital broadcast system according to the present invention.

To provide an EPG service according to the present invention, the digital device 910 performs a registration procedure by communicating with the first server 915. For example, the digital receiver 910 initially transmits device information thereof to the first server 915 (S1002), and receives a setting value based on the transmitted device information, i.e. a service-list-set-ID from the first server 915 (S1004). Here, the device information includes a device country, receiver type, and service list, for example. The device country may be Korea (KR), Germany (DE), or England (UK), for example. The receiver type may mean terrestrial, cable, satellite, and Internet Protocol TV (IPTV), for example. The service list may include at least one of a list of services or channels that can be accessed by the digital receiver through auto-scan, 3-ID, and service name.

The 3-ID includes, for example, an original network identifier, a transport stream identifier, and a service identifier. The 3-ID may serve, independently or along with the service name, as a reference group or a super-set that is used when the first server 915 collects, combines and processes service data received from each digital receiver. The first server 915 configures a group with reference to the 3-ID and/or the service name. An identifier to identify each group is a service-list-set-ID. As such, the first server 915 may sort and group service data received from the digital receiver, and thereafter acquire various latest service data. Of course, in this case, service data of the external EPG provider 990 may also be collected and stored. Meanwhile, although the group may be called a super-set, the group may include at least two super-sets as subordinate groups when it is necessary to sort the group into the subordinate groups based on, for example, a service name in the group. For example, the digital receiver 910 may transmit a service list containing device information, such as a device country of UK, a receiver type of DVB-T, and 3-ID, i.e. dvb://233a.2f.1, to the first server 915. Here, "233a" may mean an original network identifier, "2f" may mean a transport stream identifier, and "1" may mean a service identifier.

In addition to the above described device information, the digital receiver 910 may further transmit, for example, at least one of device type information such as a model number or model name of a corresponding device, device language information such as language provided by or used in the corresponding device, and user ID information previously registered in the first server 915 to the first server 915.

The first server 915 determines whether or not the corresponding digital receiver 910 is within a super-set or group based on the device information transmitted from the digital receiver 910, and transmits identification information of the corresponding super-set or group, i.e. a service-list-set-ID to the digital receiver 910 based on the determined result.

The service-list-set-ID may function as communication information or identification information between the digital receiver 910 and the first server 915. In other words, after the digital receiver 910 and the first server 915 complete mutual recognition via the above described procedure, the service-list-set-ID is used in a substantial service data transmission/reception procedure, such as, for example, updating of EPG service data from each digital receiver to the first server 915 or reception of EPG service data from the first server 915.

Herein, the service-list-set-ID is a value that is used to sort a bundle of service lists, i.e. super-sets or groups in the case in which the first server 915 manages EPG data on a per service list basis. In a general case, as described above, the super-sets or groups may be configured by two kinds of device information, i.e. a device country and a receiver type. For example, in the case of Europe, if 3-ID is equally used in one country on a per receiver type basis, the service lists may be regarded as the same service and may be within the same super-set or group.

Thereafter, each digital receiver transmits and/or updates the service list containing EPG service data to the first server 915 (S1006). Here, the service list may include the 3-ID and/or the service-list-set-ID received from the first server 915 except for the EPG service data. Additionally, the service list may include SI data received from the broadcast station or various information provided by each receiver, and may transmit the SI data and information separately or as be included in the EPG service data. For example, the service list may further include service type information on each content (SD/HD/3D) and language information on the corresponding content (e.g., Korean, English, Spanish and Germany) under the assumption that the information are transmitted along with the EPG service data. The service list may further include information on a program title, start time, end time, duration, rating, and genre, for example, for transmission and reception of the information. In addition, the service list may include language information associated with a corresponding program, video resolution, AV type, and the presence of captioning.

The EPG service data is read from the service information included in the digital broadcast signal transmitted from the digital receiver 910 to the broadcast station 905. As described above, the service information containing the EPG service data includes, for example, an SDT and service event, i.e. a program EIT in the case of DVB terrestrial. In other words, the digital receiver 910 extracts data for configuring an EPG service by parsing an SDT and an EIT from the digital broadcast signal, and stores the extracted data in a storage unit. Then, the digital receiver 910 transmits the service list, which includes at least one of the EPG service data stored as described above and the 3-ID and the service-list-set-identifier as described above, to the first server 915.

In Operation S1006, each digital receiver may transmit the EPG service data to the first server 915.

The first server 915 may receive and process the EPG service data provided from each digital receiver. Upon processing, the EPG service data of the external EPG provider 990 may be used. However, if collision between the respective EPG service data occurs upon processing, the SI information may have a priority.

Hereinafter, a processing procedure of the EPG service data in the first server 915 will be described in detail.

If the device information of each digital device is received in Operation S1002 as described above, the control unit 920 transmits the received device information to the crawler module 930. The crawler module 930 configures super-sets having the same service list based on the device information of each digital device, and returns an identifier of the configured super-sets, i.e., a service-list-set-ID to the control unit 920. Alternatively, the control unit 920 may determine the super-list-set-ID based on the device information.

The control unit 920 returns the service-list-set-identifier returned from the crawler module 930 to the corresponding digital receiver.

If the control unit 920 receives the EPG service data from each digital receiver after the service-list-set-identifier has been returned to the digital receiver, the control unit 920 transmits the EPG service data to the crawler module 930 (S1008).

The crawler module 930 transmits the input EPG service data of each digital receiver to the processor 950 (S1010).

In this case, the crawler module 930 may analyze, for example, an updated parameter from the EPG service data of each digital receiver.

Also, the crawler module 930 may process the analyzed result on a per service-list-set-ID basis, and transmit the analyzed result to the processor 950 along with the read service-list-set-ID.

In this case, although each digital receiver may transmit the EPG service data to the first server 915 at the same time, alternatively, each digital device may transmit the EPG service data at different times.

As a result of analyzing the EPG service data received from a particular digital receiver, for example, the crawler module 930 may not transmit the analyzed result to the processor 950 and remove the analyzed result if it is determined that the EPG service data has the same parameter as previously updated service data from another digital receiver or has a version lower than the service data, for example.

The crawler module 930 may transmit the EPG service data to the processor 950 whenever the EPG service data is received from each digital receiver. However, in consideration of overload of the processor 950, a sufficient level of updated parameters may be accumulated or may periodically be transmitted to the processor 950, which may reduce overall load of the server. The crawler module 930 may transmit a control signal to adjust a transmission period of the digital receiver that has transmitted the corresponding EPG service data if the version of the received EPG service data is equal to or lower than the version of the previously updated EPG service data.

The processor 950 receives the EPG service data of each digital receiver transmitted from the crawler module 930, and stores the received EPG service data in the database 970.

Here, the processor 950 receives the EPG service data from the external EPG provider 990 periodically or non-periodically.

The processor 950 sorts the EPG service data received from the crawler module 930 and the external EPG provider 990 based on, for example, the previously configured super-sets, i.e., the service-list-set-ID, and processes and stores the sorted EPG service data in the database 970 in a unit of the aforementioned super-set (S1012).

For example, translation and merge may be used for the processing procedure. The service-list-set-ID and basic information required for channel change per broadcast standard may be added for later EPG service data search.

Through the above described operation S1012, data processing for an advanced EPG service is performed.

The control unit 920 or the SNS module 925 under control of the control unit 920 may autonomously collect/generate information for provision of an SNS linked to content and information on a data exchange space. Also, the control unit 920 or the SNS module 925 under control of the control unit 920 may store the information for provision of an SNS and the information on the data exchange space in the first or second database or in a separate database through at least one of the control unit 920, the crawler module 930, and the processor 950. Meanwhile, the control unit 920 or the SNS module 925 under control of the control unit 920 may request generation or provision of the information for provision of an SNS linked to content or the information on the data exchange space via communication with the SNS server 990. In this case, the control unit 920 or the SNS module 925 may generate information required to access a particular server, i.e. identifier information based on information previously received from the corresponding server, and transmit the generated information to the digital receiver 910.

Thereafter, the information for provision of an SNS linked to content may be provided as follows in response to an EPG service provision request from each digital receiver.

If an EPG service provision request is received from the user, the digital receiver 910 transmits a search parameter as well as the previously received service-list-set-ID to the first server 915, to request provision of an EPG service (S1014).

In this case, the search parameter may include, for example, query information, start index information, maximum result information, category information, and sort information, in addition to the aforementioned device information. In particular, an EPG may be set based on the category information to request provision of an EPG service according to the present invention. However, if the category is set to 'all', for example, information on a CP tap (for example, YouTube tap) as well as a real time tap may be received. In the case of the CP tap, only Uniform Resource Locator (URL) information may be provided.

The control unit 920 checks the request of the digital receiver 910 and determines whether or not the corresponding request is a request for transmission of the updated EPG service data or the request for provision of an EPG service as described in Operation S1014.

If the determined result shows that the corresponding input is the request for provision of an EPG service, the control unit 920 transmits a search request including the search parameter to the search module 940 (S1016).

The search module 940 analyzes the search parameter included in the search request from the control unit 920.

The search module 940 transmits the analyzed result of the search parameter to the search engine 980, and the search engine 980 searches the databases 690 and 970 based on the transmitted search parameter (S1018).

The search engine 980 receives the searched result from the respective databases 960 and 970 and transmits the received result to the search module 940.

The search module 940 analyzes the search result received from the search engine 980, configures the analyzed result in a response format corresponding to the request generated in Operation S1016, and returns the response to the control unit 920. In this case, the returned response of the search module 940 may be xml format, for example.

The control unit 920 transmits the EPG service data returned from the search module 940 to the corresponding digital receiver (S1022). Here, the returned EPG service data includes, for example, the above described information on an SNS linked to content according to the present invention.

The corresponding digital receiver parses the EPG service data received from the first server 915 in response to the request for provision of an EPG service, and configures an EPG from the parsed result to provide the EPG to the user (S1024). In this case, the parsed EPG service data may be stored in the storage unit. The digital receiver may filter data that cannot be processed or provided by the corresponding digital receiver among the received EPG service data, and provide the filtered data on a screen.

In the above described service system of FIG. 9 according to the present invention, an SNS may use or may not use the crawler module.

In the present invention, an open SNS refers to the case in which a server with or without the crawler module 930 configures and provides at least one SNS linked to any content, whereby a user of a digital receiver uses the SNS.

The open SNS allows the server to automatically open an SNS data exchange space via recognition of a popular broadcast program using the above described crawler module 930 of FIG. 9. For example, according to the present invention, the server may automatically issue a temporary SNS ID with respect to a broadcast program that exhibits a high real time viewing rate. This allows simultaneous chat of users of several SNSs that use an open API, such as Facebook, Twitter, etc. Also, according to the present invention, all digital receivers may display an SNS ID (i.e. an ID with respect to a program) as well as viewing rate information, and users who registered as followers or friends of the corresponding SNS ID are permitted to participate in a chat or to access chat content.

On the other hand, in the case of the open SNS without the crawler module 930 according to the present invention, a management server on a per country or local area basis may preset opening of an SNS chat room with respect to a broadcast program that has a possibility of becoming an issue. To this end, according to the present invention, if the server issues a temporary SNS ID with respect to a preset broadcast program and displays the SNS ID as well as a channel browser and a service guide, for example, to assist all digital receivers in recognizing opening of a chat room, users who registered as followers or friends of the corresponding SNS ID may participate in a chat and access chat content.

For example, when the server recognizes a popular broadcast program and automatically opens a data exchange space, the server automatically issues a temporary SNS ID with respect to the broadcast program having a high real time viewing rate. In this case, a plurality of users of an open SNS, such as Facebook, Twitter, M2 day, etc., may perform data exchange, i.e. chat via the temporary SNS ID. Meanwhile, in relation to the viewing rate, the server may issue a temporary SNS ID with respect to a program that acquires a high viewing rate every hour, and may omit the SNS ID upon ending of the corresponding program. The temporarily issued SNS ID may be configured into, for example, LG_smartSNSkbs_spaymyungwal@lge.com. According to a UI access scenario of the present invention, for example, the access to a viewing screen or a channel browser screen of a smart-TV that is manufactured by the same manufacturer as the server and to an SNS application of a digital receiver is possible. Also, the present invention may control TVs or smart-phones of different manufacturers to participate in an SNS based on a particular search word (e.g., "LG_smart_SNS") in linkage with an SNS server. Thereby, the present invention allows all users with or without digital receivers of a particular manufacturer to conveniently use an SNS, which results in enhanced SNS service quality and enables convenient use of an SNS even via mobile appliances.

On the other hand, in the present invention, a closed SNS refers to the case in which a user who wishes to use an SNS has to request linkage of an SNS to a server that provides content. If a user who wishes to open an SNS data exchange space with respect to a particular broadcast program requests opening of the SNS data exchange space via, for example, an application of the digital receiver, the server may open the corresponding SNS data exchange space using service guide information transmitted from the digital receiver and an SNS ID (as necessary, the data exchange space may be opened via communication between the server and the digital receiver). Then, the server may automatically send invitations to SNS followers or friends of the user who requests opening of the data exchange space (i.e. to digital receivers and/or mobile appliances of the SNS followers or friends), thereby allowing the followers or friends who accept invitation to participate in a chat and access chat content.

FIGS. 11 to 18 are views illustrating various embodiments of provision of an SNS in linkage with content according to the present invention. These embodiments relate to provision of a user interface (UI).

Figure 11:
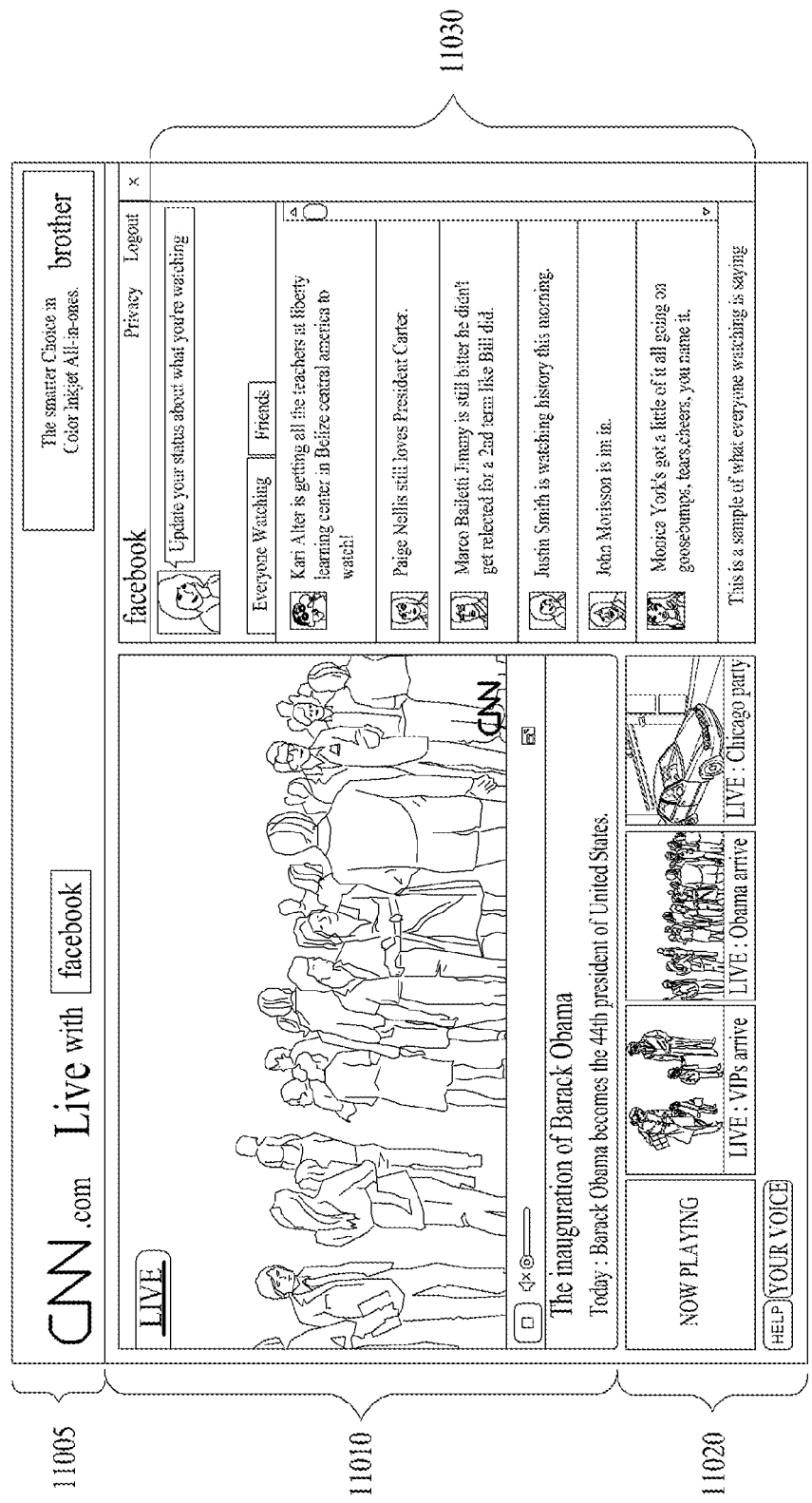
FIGS. 11 to 18 are views illustrating various embodiments of provision of an SNS linked to content according to the present invention.

FIG. 11 illustrates, for example, a screen of a digital receiver when a user executes an SNS application while watching a live broadcast, or a screen that provides an SNS linked to content according to the present invention.

The former refers to the case in which the user executes an SNS application during viewing of a live broadcast or requests live broadcast viewing during execution of an SNS application. A first area 11005 displays a logo with respect to a live broadcast (e.g., "CNN.com") and a phrase (e.g., "Live with Facebook") indicating that an SNS is being executed. A second area 11010 provides a live broadcast. A third area 11020 provides a thumbnail image or a channel browser. A fourth area 11030 provides an SNS.

In this case, if the live broadcast and the SNS are individually executed on the screen of the digital receiver, they have no need to be linked with each other in terms of content. Alternatively, even if the live broadcast and the SNS are linked with each other, as described above, the user needs to execute an application associated with the SNS, and thereafter perform a login procedure. Therefore, up to now, there are problems in that watching a live broadcast is impossible and in that great time and effort are required to select one of a plurality of data exchange spaces associated with content even after execution of an SNS.

On the other hand, in the case of the latter, the server according to the present invention previously opens an SNS linked to content and provides a temporary SNS ID to contribute to access convenience. This allows the user to directly participate in an SNS even while watching a live broadcast despite having the same screen configuration as in the former case, thereby contributing to user convenience owing to reduced time and effort.

Figure 12:
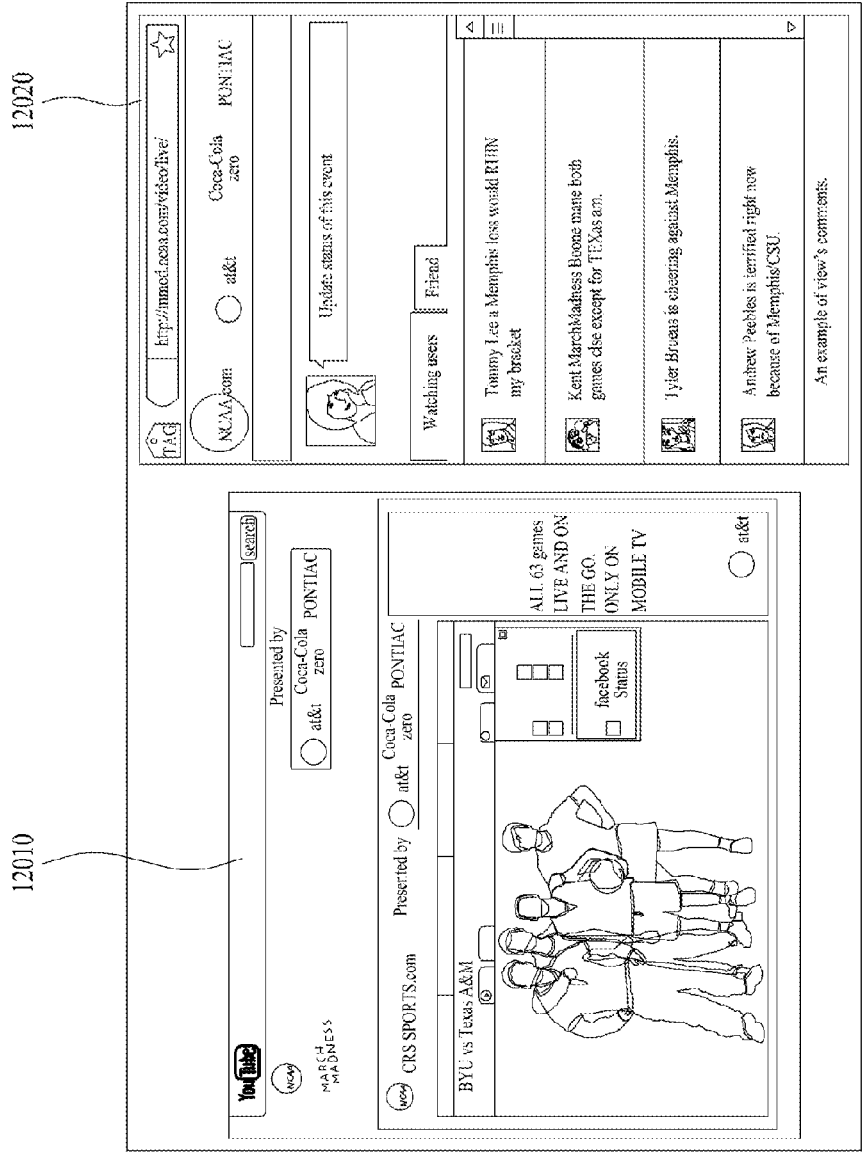

FIG. 12 illustrates, for example, a screen configuration in which the user uses an SNS while enjoying a web service, such as YouTube, instead of the above described live broadcast as illustrated in FIG. 11. A description of FIG. 12 is equal to the above description of FIG. 11 except for the live broadcast being replaced by YouTube, and thus a detailed description will be omitted and replaced by the above description.

Figure 13:
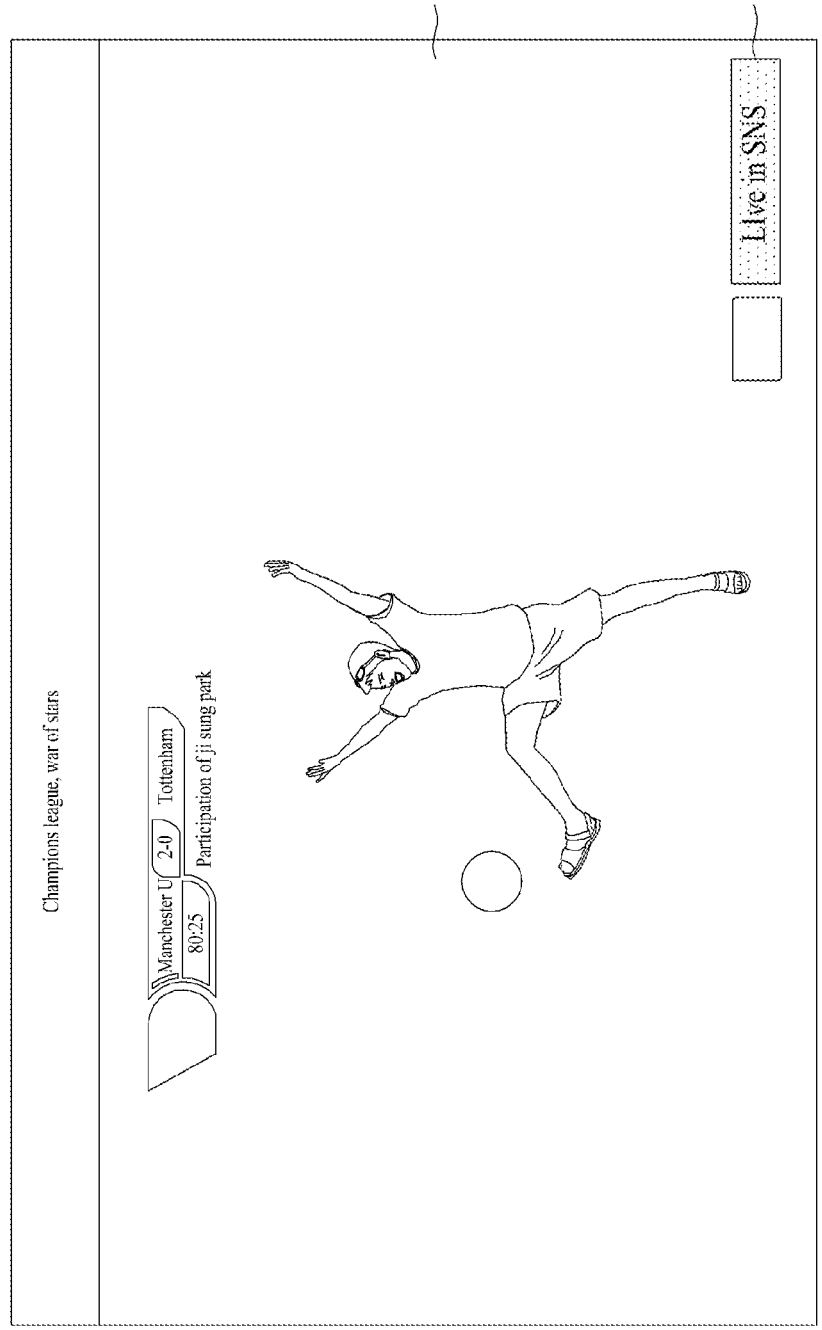

FIG. 13 illustrates an example of an SNS access scenario according to the present invention. For example, the server may not previously open an SNS data exchange space in relation to certain content as occasion demands. More specifically, the server may open an SNS data exchange space only in relation to high rank content on the basis of the real time viewing rate. The real time viewing rate must be known only after a certain time has passed from execution of corresponding content. Accordingly, if the user has already executed corresponding content 13020, the user can use an SNS only when knowing the fact that the SNS data exchange space is provided. As one example to this end, as illustrated in FIG. 13, a message "Live in SNS" indicating that an SNS data exchange space is opened and use of an SNS is possible may be displayed in a content area 13010 provided by a digital receiver.

In this regard, the UI 13010 as illustrated in FIG. 13 according to the present invention may contain a great amount of information. For example, although not illustrated, if the user selects the corresponding UI, the digital receiver may provide a UI to inquire as to whether or not the user selects use of an SNS provided by the server, and provide the SNS based on user selection. In the case of providing the SNS based on user selection, for example, if there are present a plurality of SNSs or a plurality of data exchange spaces is opened in a particular SNS, this information may be given in a sub-menu form such that any SNS or data exchange space may be output based on user selection. Of course, when the SNS or data exchange space is provided automatically or based on user selection, as illustrated in FIGS. 11 and 12, different screen configurations may be provided.

Figure 14:
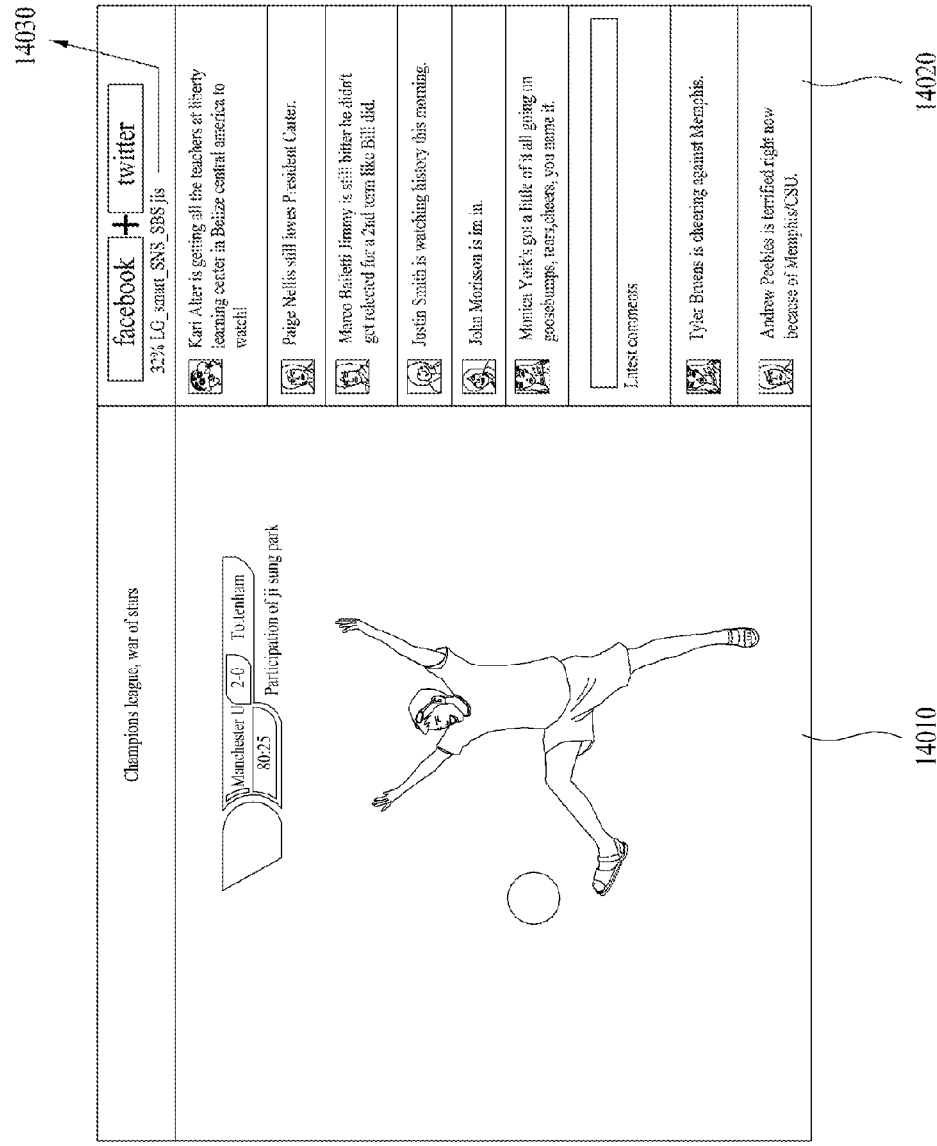

FIG. 14 illustrates an example of a screen that provides an SNS linked to content according to FIG. 13. In FIG. 14, differently from FIGS. 11 and 12, the screen may show that the corresponding SNS is not a single SNS, but an integrated SNS of a plurality of SNSs (for example, Facebook+Twitter in FIG. 14) and may also display a real time viewing rate of corresponding content (32%) and an issued temporary SNS ID (32% LG_smart_SNS_SBS_jis). For example, as described above, the screen may be used to provide friends with information on use of an SNS, and may be used to allow access of a mobile appliance, a PC, or other receivers that are not manufactured by the same manufacturer as the server. Input may be performed using a cellular phone SNS application or a TV input device, such as a USB keyboard or a virtual keyboard.

In the case in which the server provides a service of FIGS. 13 and 14, the server may issue an SNS ID for three high rank broadcast programs in relation to the real time viewing rate, and give a notification the digital receiver. Then, if the user selects the notification using a general remote controller or a magic remote controller, the user is automatically registered as a friend or follower of the corresponding program SNS ID, and is permitted to participate in a chat. However, in this case, it may be necessary for the user to join an SNS and previously register an ID and a password in the digital receiver. Alternatively, it may be necessary that an associated SNS application has previously been downloaded in the digital receiver. If the digital receiver does not have the SNS application, the server may provide the corresponding application to download and install the application in the digital receiver. According to the present invention, in the case of providing the SNS linked to content as illustrated in FIG. 14, a semitransparent chat screen may be displayed on an area of a live broadcast screen to induce more active participation of many and unspecified persons in a popular program and to allow the user to upload his/her opinion. Also, a semitransparent chat window may be provided in an area so as not to disrupt viewing of a live channel.

In the present invention, if a plurality of SNSs linked to content is present or a plurality of data exchange spaces is opened in a particular SNS, this information may be displayed. Accordingly, this assists the user in conveniently using an SNS linked to content or a data exchange space even without change of content or requiring an operation for provision of an SNS if the user does not like and wishes to change any SNS or data exchange space that is being executed. Moreover, it is possible to provide the user who enjoys an SNS linked on content with information on an SNS linked to other content. For example, if the user selects the SNS linked to other content, it is possible to allow the user to use the SNS linked to other content without change of content, i.e. while watching current content, and to change the current content simultaneously with selection of the SNS linked to other content.

Figure 15:
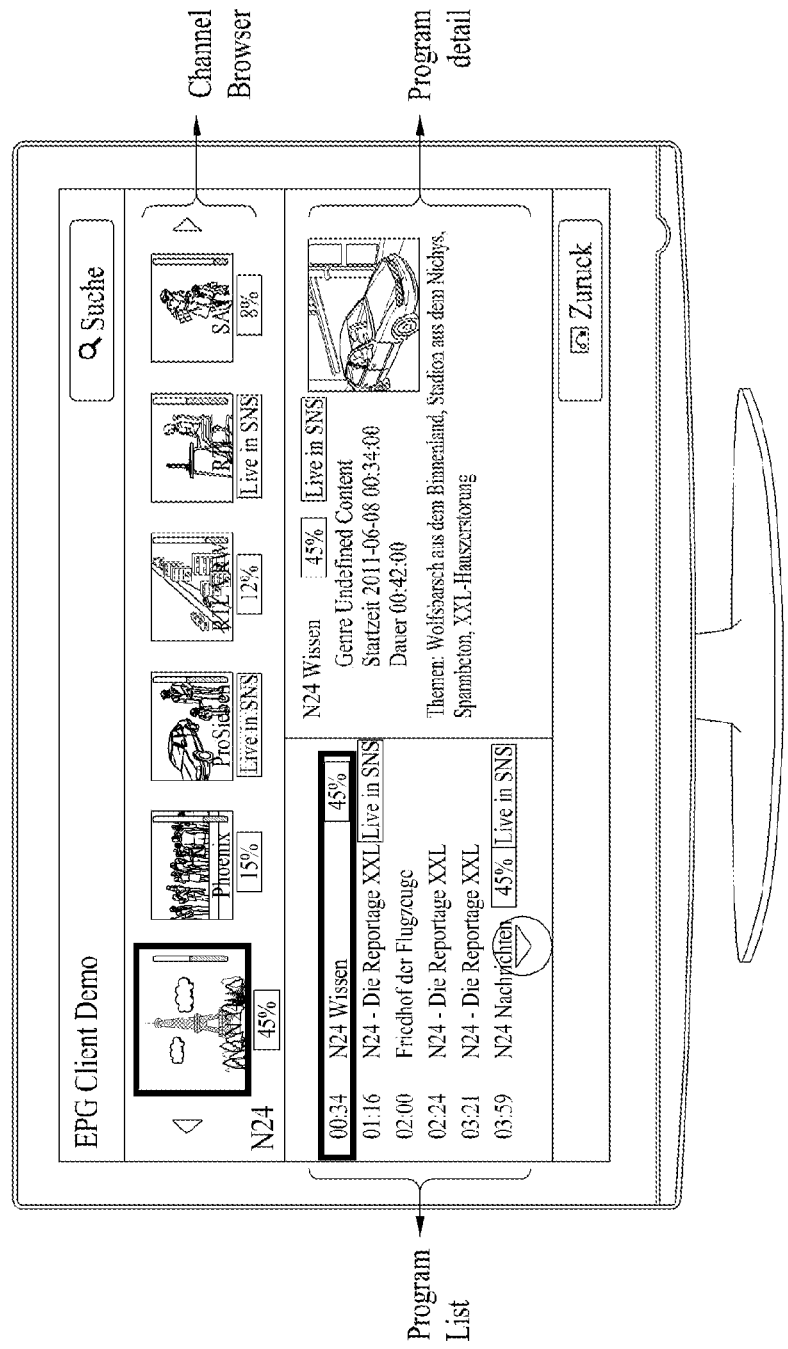

FIG. 15 illustrates another example of an SNS access scenario according to the present invention. For example, FIG. 15 illustrates a service guide.

Referring to FIG. 15, a thumbnail image or a channel browser may be provided in an area of a service guide, and information on the viewing rate or information indicating that an SNS linked to a channel or broadcasting content of the corresponding channel is opened as well as information for convenient access to the SNS (e.g., a message such as "Live in SNS" or an SNS ID) may be provided in or at a lower end of a channel browser screen. Meanwhile, a program list may be provided in another area of the service guide, and detailed information on a channel or program selected by the channel browser or the program list may be provided in the other area of the service guide. The viewing rate information and/or SNS access information may be provided over the program list and/or detailed program information as in the above described channel browser. Accordingly, if the user selects, for example, content or access information on an SNS linked to the content from the service guide as illustrated in FIG. 15, the content and the SNS linked to the corresponding content may be provided simultaneously.

Figure 16:
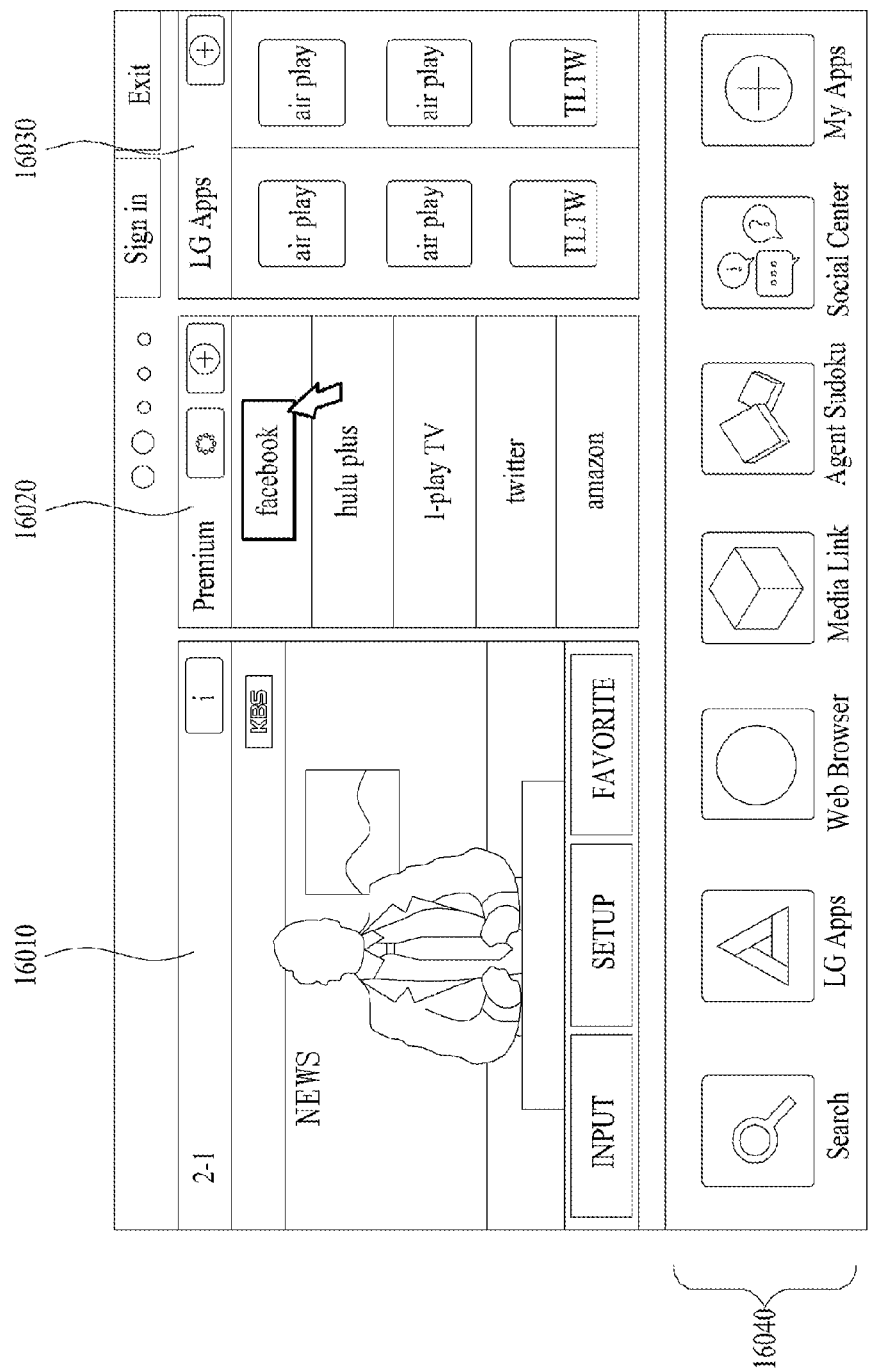
Figure 17:
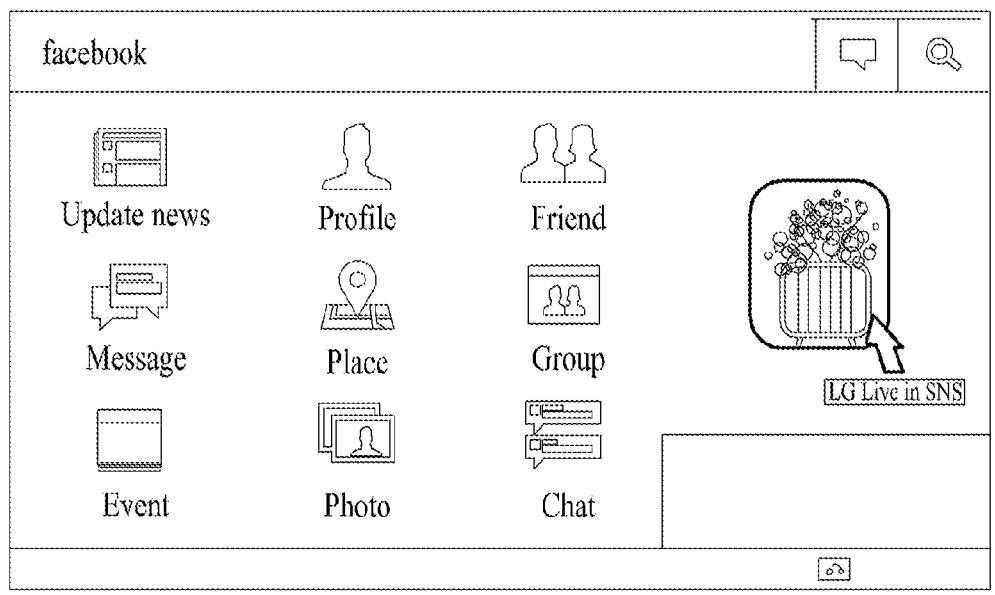
Figure 18:
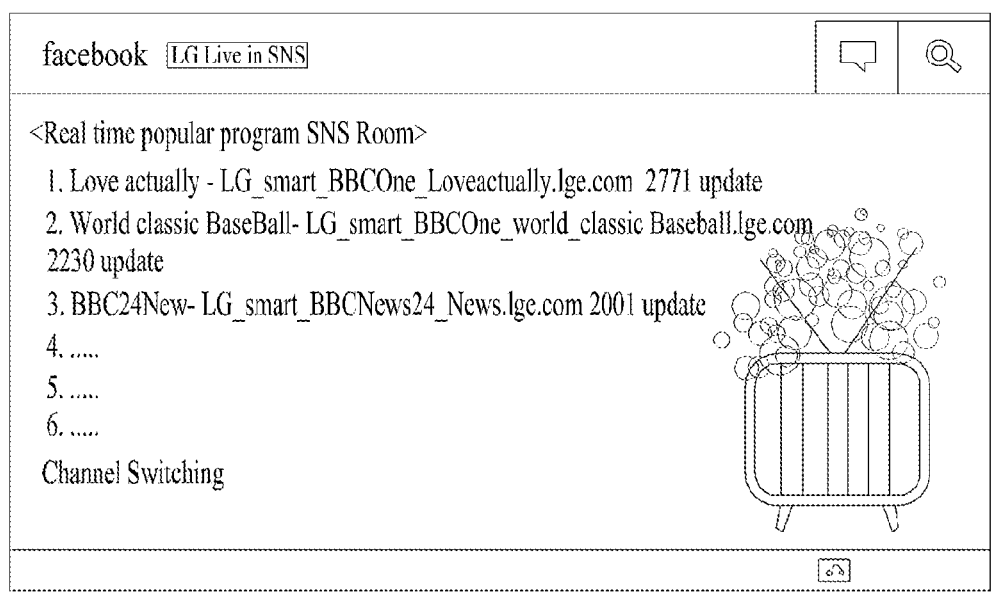

FIGS. 16 to 18 illustrate a further example of an SNS access scenario according to the present invention. For example, an SNS linked to content according to the present invention may be provided by a digital receiver or using a previously provided SNS.

As illustrated in FIG. 16, the digital receiver may provide a first area 16010 with a live broadcast, a second area 16020 with a premium service list, a third area 16030 with an application provided by a manufacturer, a fourth area 16040 with UIs for various functions.

For example, it is assumed that the user of the digital receiver selects an SNS via a menu while watching a live broadcast. In this case, as described above, in addition to providing the live broadcast with access information on the SNS linked to the live broadcast, an access method for an SNS may be provided when the user executes an SNS application as illustrated in FIG. 16.

Accordingly, as illustrated in FIG. 17, an SNS screen may provide a live broadcast, a UI or a folder (e.g., named as "LG live in SNS") related to an SNS or a data exchange space provided by the digital receiver or the server.

If the UI or the folder of FIG. 17 is selected, for example, a list of data exchange spaces that are available in the digital receiver or provided by the server or detailed information may be provided as illustrated in FIG. 18.

For example, the access scenario of FIG. 17 or 18 may be more readily available when using an external input or a PVR service.

As described above, the method of providing a service in the digital receiver according to the present invention includes selecting content including an identifier with respect to an SNS or a data exchange space that is opened in linkage with content from a service guide, and outputting the selected content and the SNS or the data exchange space linked to the content in respective areas of a screen. The SNS linked to the content includes a data exchange space configured to allow one or more SNS users to simultaneously access the data exchange space using an open API from the server. The SNS may further include a SNS identifier having a format as access information for the corresponding data exchange space.

The above described method may further include at least one of requesting opening of an SNS data exchange space linked to a particular program, determining whether or not a request for content change or channel switching is input, and determining whether or not an SNS linked to changed content or a switched channel is present if the determined result shows that the request for content change or channel switching is input. Meanwhile, depending on the presence of the SNS linked to the changed content or the switched channel, the method may further include inquiring whether or not to terminate an existing SNS or providing a new SNS after automatically terminating the existing SNS. The SNS may be executed via a corresponding SNS application previously stored in the digital receiver.

The SNS identifier may be allotted from at least one of an associated SNS server and a server to which the digital receiver belongs. The format of the SNS identifier may be configured to provide existing SNSs with each data exchange space linked to the output content regardless of a service type, and the SNS may be at least one of an open SNS and a closed SNS. The SNS identifier may be exclusive to the corresponding digital receiver regardless of channel, content, and SNS types, and the provided SNS may also provide information on the viewing rate of corresponding content. The method may further include receiving a digital signal including content and signaling information on the content. The linked SNS may be determined based on at least one of a user who uses the same content, an open chat with respect to common interest content, a closed chat with respect to personal interest content, genre, sex, ages, content, viewing rate, rating, time, channel, broadcast station, manufacturer, friend, and series.

In another example, the method of providing a service in the digital receiver according to the present invention may include executing an SNS, outputting, based on a reference, a list of at least one service item linked to at least one content among the executed SNS, and outputting a service window for the service item selected from the output list and content linked to the service item in respective areas.

According to the present invention as described above, a variety of SNS scenarios may be provided via a digital system and a service system for the same. For example, even if a user is not a member of an SNS and/or even if the user does not execute and/or log into an SNS application provided in the digital receiver, the user is permitted to use the SNS while executing a broadcast program, a game or another application. The digital receiver may provide a UI to assist the user in more easily and conveniently using the SNS. The service system and the digital receiver may provide a further improved active SNS environment, thereby achieving enhanced user convenience and product satisfaction to increase purchase desire.

The service system and the method of providing a service in the digital receiver according to the present invention are not limited to the configurations of the above described various embodiments, and those skilled in the art will appreciate that various modifications and/or substitutions are possible. For example, those skilled in the art may selectively combine all or some of the respective embodiments of the present invention.

The service system and the method of providing a service in the digital receiver according to the present invention may be implemented as code that can be written on a processor readable recording medium and thus read by a processor provided in the service system and/or the digital receiver. The processor readable recording medium may be any type of recording device in which data is stored in a processor readable manner. Examples of the processor readable recording medium include a ROM, a RAM, a CD-ROM, a magnetic tape, a floppy disc, an optical data storage device, and a carrier wave (e.g., data transmission over the Internet). Also, the processor readable recording medium can be distributed over a plurality of computer systems connected to a network so that processor readable code is written thereto and executed therefrom in a decentralized manner.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of providing a service in a digital receiver, the method comprising:
    outputting video data of a content corresponding to a broadcast program on a screen;
    displaying a GUI corresponding to information on one or more Social Networking Services (SNSs) or a data exchange space opened in linkage with the broadcast program, wherein the GUI is displayed when a certain time is passed from a start of the broadcast program and the data exchange space is opened only if a real time viewing rate of the broadcast program exceeds a predetermined rate; and
    outputting the data exchange space linked to the broadcast program together with the video in respective areas of the screen in response to a selection of the GUI, the GUI having a channel browser including a thumbnail image corresponding to the broadcast program of each channel;
    displaying the real time viewing rate of the broadcast program corresponding to each channel in a peripheral area of the thumbnail image if the real time viewing rate of the broadcast program is less than the predetermined rate; and
    displaying a message notifying the data exchange space opened in linkage with the broadcast program corresponding to each channel in the peripheral area of the thumbnail image if the real time viewing rate of the broadcast program exceeds the predetermined rate.

2. The method according to claim 1, further comprising:
    determining whether or not a request for content change or channel switching is input; and
    determining whether or not an SNS linked to changed content or a switched channel is present if the determined result shows that the request for content change or channel switching is input.

3. The method according to claim 1, wherein the SNS identifier is exclusive to the corresponding digital receiver regardless of channel, content, and SNS types.

4. The method according to claim 1, wherein the one or more SNSs further includes information on a viewing rate of corresponding content.

5. The method according to claim 1, further comprising receiving a digital signal including the broadcast program and signaling information on the broadcast program.

6. The method according to claim 1, wherein the one or more SNSs are determined based on at least one reference selected from among a user who use the same content, an open chat with respect to common interest content, a closed chat with respect to personal interest content, genre, sex, ages, content, viewing rate, rating, time, channel, broadcast station, manufacturer, friend, and series.

7. A digital receiver in a service system, the digital receiver comprising:
    a display unit configured to output video data of a content corresponding to a broadcast program on a screen; and
    a controller configured to:
        control the display unit to display a GUI corresponding to information on one or more Social Networking Services (SNSs) or a data exchange space opened in linkage with the broadcast program, wherein the GUI is displayed when a certain time is passed from a start of the broadcast program and the data exchange space is opened only if a real time viewing rate of the broadcast program exceeds a predetermined rate, and
        output the data exchange space linked to the broadcast program together with the video data in respective areas of the screen in response to a selection of the GUI,
    wherein the GUI has a channel browser including a thumbnail image corresponding to the broadcast program of each channel,
    wherein the real time viewing rate of the broadcast program corresponding to each channel is displayed in a peripheral area of the thumbnail image if the real time viewing rate of the broadcast program is less than the predetermined rate, and
    wherein a message notifying the data exchange space opened in linkage with the broadcast program corresponding to each channel is displayed in the peripheral area of the thumbnail image if the real time viewing rate of the broadcast program exceeds the predetermined rate.

8. The digital receiver according to claim 7, wherein the controller determines whether or not a request for content change or channel switching is input, and determines whether or not an SNS linked to changed content or a switched channel is present if the determined result shows that the request for content change or channel switching is input.

9. The digital receiver according to claim 7, wherein the SNS identifier is exclusive to the corresponding digital receiver regardless of channel, content, and SNS types.

10. The digital receiver according to claim 7, wherein the one or more SNSs further includes information on the viewing rate of corresponding content.

11. The digital receiver according to claim 7, further comprising a receiver that receives a digital signal including the broadcast program and signaling information on the broadcast program.

12. The digital receiver according to claim 7, wherein the one or more SNSs are determined based on at least one reference selected from among a user who uses the same content, an open chat with respect to common interest content, a closed chat with respect to personal interest content, genre, sex, ages, content, viewing rate, rating, time, channel, broadcast station, manufacturer, friend, and series.

* * * * *